United States Patent
Irikura et al.

(10) Patent No.: US 7,987,669 B2
(45) Date of Patent: Aug. 2, 2011

(54) HYDRAULIC STEERING TRANSAXLE AND HYDRAULIC DRIVING VEHICLE

(75) Inventors: Koji Irikura, Hyogo (JP); Norihiro Ishii, Hyogo (JP); Shigenori Sakikawa, Hyogo (JP)

(73) Assignee: Kanzaki Kokyukoki Mfg. Co., Ltd, Hyogo (JP)

( * ) Notice: Subject to any disclaimer, the term of this patent is extended or adjusted under 35 U.S.C. 154(b) by 0 days.

(21) Appl. No.: 12/256,857

(22) Filed: Oct. 23, 2008

(65) Prior Publication Data

US 2009/0047151 A1 Feb. 19, 2009

Related U.S. Application Data

(60) Continuation of application No. 11/617,278, filed on Dec. 28, 2006, now Pat. No. 7,455,145, which is a division of application No. 10/948,739, filed on Sep. 24, 2004, now Pat. No. 7,204,779.

(30) Foreign Application Priority Data

Sep. 26, 2003 (JP) .................. 2003-335606
Oct. 30, 2003 (JP) .................. 2003-370312

(51) Int. Cl.
*F16D 31/00* (2006.01)
*F16D 31/02* (2006.01)
(52) U.S. Cl. ............... 60/484; 60/488; 417/375
(58) Field of Classification Search .......... 417/269, 417/271, 375; 180/234, 242; 91/499, 505; 92/146, 148; 60/487, 489, 490, 484
See application file for complete search history.

(56) References Cited

U.S. PATENT DOCUMENTS

| | | | |
|---|---|---|---|
| 4,856,368 A | 8/1989 | Fujisaki et al. | |
| 4,886,142 A | 12/1989 | Yamaoka et al. | |
| 4,893,524 A | 1/1990 | Ohashi et al. | |
| 5,465,806 A | 11/1995 | Higasa et al. | |
| 6,189,641 B1 | 2/2001 | Azuma | |
| 6,196,348 B1 * | 3/2001 | Yano et al. | 180/242 |
| 6,237,708 B1 | 5/2001 | Kawada | |
| 6,401,854 B2 | 6/2002 | Yano et al. | |
| 6,454,033 B1 | 9/2002 | Nathan et al. | |
| 6,604,596 B2 | 8/2003 | Bracke et al. | |
| 6,637,535 B2 * | 10/2003 | Nemoto | 180/248 |
| 6,668,549 B2 * | 12/2003 | Yano et al. | 60/433 |
| 6,732,828 B1 | 5/2004 | Abend et al. | |
| 6,860,354 B2 * | 3/2005 | Hasegawa | 180/242 |
| 6,926,111 B1 * | 8/2005 | Irikura | 180/234 |
| 6,932,179 B2 * | 8/2005 | Sakikawa et al. | 180/242 |
| 2001/0035014 A1 * | 11/2001 | Yano et al. | 60/490 |
| 2003/0079928 A1 * | 5/2003 | Hasegawa | 180/248 |

FOREIGN PATENT DOCUMENTS

| | | |
|---|---|---|
| JP | 64-004535 | 1/1989 |
| JP | 2594951 | 12/1996 |
| JP | 2000-001127 | 1/2000 |
| JP | 2002-172946 | 6/2002 |

\* cited by examiner

*Primary Examiner* — Charles G Freay
*Assistant Examiner* — Patrick Hamo
(74) *Attorney, Agent, or Firm* — Sterne, Kessler, Goldstein & Fox P.L.L.C.

(57) ABSTRACT

A fluid passage member includes a pump mounting surface onto which a hydraulic pump having a rotary axis is mounted; first and second kidney ports opened at the pump mounting surface; a first fluid extraction port outwardly opened and connected to the first kidney port; a motor mounting surface onto which a hydraulic motor having a rotary axis is mounted so that the rotary axis of the hydraulic motor is parallel to the rotary axis of the hydraulic pump; third and fourth kidney ports opened at the motor mounting surface; and a second fluid extraction port outwardly opened and connected to the third kidney port.

9 Claims, 20 Drawing Sheets

HYDRAULIC STEERING TRANSAXLE AND HYDRAULIC DRIVING VEHICLE

CROSS-REFERENCE TO RELATED APPLICATIONS

This application is a continuation of U.S. application Ser. No. 11/617,278, filed Dec. 28, 2006, which is a divisional of U.S. application Ser. No. 10/948,739, filed Sep. 24, 2004, now U.S. Pat. No. 7,204,779, issued Apr. 17, 2007, the entire disclosures of which are incorporated herein by reference thereto.

BACKGROUND OF THE INVENTION

1. Field of the Invention

The invention relates to a steering transaxle having a hydraulic motor for driving steerable wheels. The invention also relates to a hydraulic driving vehicle, especially a four-wheel driving vehicle, e.g., an agricultural tractor, a riding mower and a construction machine, comprising the steering transaxle.

2. Related Art

As disclosed in the Japanese Patent No. 2594951 (document '951) and the Japanese Laid Open Gazettes Nos. 2002-172946 (document '946) and 2000-1127 (document '127), there are conventional well-known four-wheel driving vehicles, each of which has a front steering transaxle and a rear unsteering transaxle. The front steering transaxle supports steerable front wheels and incorporating a front differential gear unit mutually differentially connecting the front wheels, and the rear unsteering transaxle supports unsteerable rear wheels and incorporating a rear differential gear unit mutually differentially connecting the rear wheels, wherein the speed ratio between the steerable wheels and the unsteerable wheels is changed according to the steered angle of the steerable wheels.

The vehicle disclosed in the document '946 is provided with a large and complicated mechanical (planetary gearing) center differential gear unit interposed between the front steering transaxle and the rear unsteering transaxle. A large middle space of the vehicle is necessary for arranging the center differential gear unit, and two front and rear propeller shafts for transmitting power of the center differential gear unit to the respective front and rear transaxles, thereby causing designing limitation.

With respect to the conventional hydraulic driving vehicles disclosed in the documents '951 and '127, instead of the center differential gear unit with the front and rear propeller shafts, each of the vehicles is provided with a variable displacement hydraulic motor for driving the front differential gear unit, a fixed displacement hydraulic motor for driving the rear differential gear unit, and a common hydraulic pump for supplying both the hydraulic motors with hydraulic oil one after another, thereby increasing a free space for arranging various parts.

With respect to the disclosed conventional hydraulic driving vehicles, it is desired for smoothly driving the steerable front wheels that the displacement of the front hydraulic motor is reduced as far as possible so as to correspond to the reduced hydraulic oil after passing the rear hydraulic motor. However, such displacement of the front hydraulic motor causes increase of the rotary speed of the front hydraulic motor, thereby requiring increase of the deceleration ratio between the front hydraulic motor and the steerable front wheels so as to be balanced with the rotary speed of the unsteerable rear wheels. Upsizing of a deceleration gear train between the front hydraulic motor and the front differential gear unit for ensuring the increased deceleration ratio is not desired because it causes the front steering transaxle incorporating the deceleration gear train to expand the vehicle vertically and lengthwise so as to reduce ground clearance below.

Further, the rotary axis of the front hydraulic motor (its motor shaft) is disposed perpendicularly to that of the axles of the front wheels. If the front hydraulic motor and the front differential gear unit are disposed in a transaxle casing, the transaxle casing must be large lengthwise of the vehicle so as to ensure the length of the motor shaft.

Further, if a steering transaxle incorporating a variable displacement hydraulic motor, a deceleration gear train and a differential gear unit is to be constructed, it requires many parts and units to be assembled and properly located. Easy assemblage of the steering transaxle such as to overcome the difficulty of assembling and locating many parts and units is desired for reducing labor and time.

Further, the vehicle disclosed in the document '127 is provided with brakes in the rear transaxle so as to individually brake the respective unsteerable rear wheels. Since the vehicle has the variable displacement hydraulic motor for driving the steerable front wheels, and the fixed displacement hydraulic motor for driving the unsteerable rear wheels, the steerable front wheels are accelerated and the unsteerable rear wheels are not reduced during turning of the vehicle. In brief, the high speed of the unsteerable rear wheels that occurs during straight traveling of the vehicle is kept even during turning of the vehicle, thereby increasing a centrifugal force applied onto the turning vehicle and making the vehicle unstable. Further, in this condition during turning of the vehicle, if the vehicle brake-turns, i.e., if one of the brakes is actuated for braking, a braking shock may occur.

SUMMARY OF THE INVENTION

A first object of the invention is to provide a hydraulic steering transaxle which is compact and can be easily assembled.

To achieve the first object, according to a first aspect of the invention, a steering transaxle comprises: left and right drive shafts drivingly connected to respective steerable wheels; a differential gear unit differentially connecting the drive shafts to each other; a transaxle casing having an opening, the transaxle casing incorporating the differential gear unit and the drive shafts; a cover for covering the opening of the transaxle casing; a variable hydraulic motor having a movable swash plate, the hydraulic motor being provided on the inside of the cover so as to drive the differential gear unit; a motor control mechanism for controlling the movable swash plate, the motor control mechanism being provided on the outside of the cover; and a hydraulic oil port for oil supply and delivery of the hydraulic motor, the hydraulic oil port being provided on the outside of the cover. Due to the external arrangement of the motor control mechanism and the hydraulic oil port, the transaxle casing can be slimmed.

In the first aspect, preferably, according to a second aspect of the invention, the steering transaxle further comprises: left and right axle support units steerably provided on left and right ends of the transaxle casing; left and right axles supported by the respective axle support units, the steerable wheels being provided on the respective axles; and a pair of deceleration gear trains each of which is interposed between each of the drive shafts and each of the axles, each of the deceleration gear trains being disposed in each of the axle support units. Due to the arrangement of the deceleration gear trains in the left and right axle support units, the transaxle casing can be further slimed.

In the first aspect, preferably, according to a third aspect of the invention, the cover, the hydraulic motor with the movable swash plate, the motor control mechanism and the hydraulic oil port constitute an assembly unit, which is detachably attached to the transaxle casing so that, by covering the opening with the cover, the hydraulic motor is disposed in the transaxle casing so as to be drivingly connected to the differential gear unit, thereby facilitating assembly and disassembly of the steering transaxle.

In the third aspect, preferably, according to a fourth aspect of the invention, the movable swash plate includes a pair of trunnion shafts, one of which is supported by the cover in the assembly unit. When the assembly unit is attached to the transaxle casing, the other trunnion shaft comes to be supported by the transaxle casing. Therefore, of the two trunnion shafts, only the other trunnion shaft is required to be located and assembled to the transaxle casing, thereby further facilitating assembly and disassembly of the steering transaxle.

In the fourth aspect, preferably, according to a fifth aspect of the invention, the hydraulic motor includes a motor shaft disposed in parallel to the drive shafts, so that a gear provided on the motor shaft meshes with an input gear of the differential gear unit so as to drivingly connect the hydraulic motor to the differential gear unit. The meshing gears on the motor shaft and the differential gear unit can be economic spur gears.

In the third aspect, preferably, according to a sixth aspect of the invention, the assembly unit includes a center section of the hydraulic motor fixed to the cover, so that, when the assembly unit is attached to the transaxle casing, the center section is sandwiched between the cover and the transaxle casing.

In the sixth aspect, preferably, according to a seventh aspect of the invention, the movable swash plate includes a pair of trunnion shafts both of which are supported by the cover in the assembly unit. Therefore, no trunnion shaft needs to be located and assembled to the transaxle casing when the assembly unit is attached to the transaxle casing, thereby further facilitating assembly and disassembly of the steering transaxle.

In the seventh aspect, preferably, according to an eighth aspect of the invention, the hydraulic motor includes a motor shaft disposed perpendicular to the drive shafts, and a bevel gear provided on the motor shaft meshes with a bevel input gear of the differential gear unit so as to drivingly connect the hydraulic motor to the differential gear unit.

In the first aspect, preferably, according to a ninth aspect of the invention, the hydraulic motor includes a cylinder block whose rotary center axis is disposed coaxially to the drive shafts. The cylinder block is directly connected to an input portion of the differential gear unit. Therefore, the hydraulic motor, the differentially gear unit and the drive shafts are disposed coaxially so as to slim the steering transaxle.

In the first aspect, preferably, according to a tenth aspect of the invention, the motor control mechanism is operatively connected to an active portion of a linkage between a steering operation device and each of the steerable wheels so as to control the slant angle of the movable swash plate according to the steered angle of the steerable wheels.

In the first aspect, preferably, according to an eleventh aspect of the invention, the motor control mechanism includes: a rotary shaft supported by the cover to interlock with the active portion; a cam provided on the rotary shaft; and a control lever supported by the cover to interlock with the movable swash plate. The rotary shaft is rotated by movement of the active portion so that the cam acts to move the control lever with the movable swash plate. Therefore, the motor control mechanism becomes simple and economic.

In the eleventh aspect, preferably, according to a twelfth aspect of the invention, the motor control mechanism further includes: a torque spring, one end of the torque spring engaging with the control lever; and a retaining member for retaining the other end of the torque spring. When the control lever is rotated by the action of the cam, the one end of the torque spring engaging with the control lever is moved away from the other end of the torque spring retained by the retaining member so as to cause a biasing force of the torque spring for returning the control lever with the movable swash plate.

In the twelfth aspect, preferably, according to a thirteenth aspect of the invention, the position of the retaining member retaining the other end of the torque spring can be adjusted. Therefore, the position of the movable swash plate, i.e., the displacement of the hydraulic motor during straight traveling of a vehicle can be adjusted.

In the first aspect, preferably, according to a fourteenth aspect of the invention, the cover is disposed on a proximal side of the transaxle casing lengthwise of a vehicle having the steering transaxle. Alternatively, according to a fifteenth aspect of the invention, the cover is disposed on a distal side of the transaxle casing lengthwise of a vehicle having the steering transaxle. Any of the proximal and distal sides of the transaxle casing can be optionally selected for arranging the cover with the exposed motor control mechanism and hydraulic oil port in consideration of positions of other members, like a tie rod or a power steering actuator, adjacent to the transaxle casing, thereby ensuring a good layout of the steering transaxle.

A second object of the invention is to provide a hydraulic driving vehicle having front and rear hydraulic motors for steerable wheels and unsteerable wheels, which can turn or brake-turn at a moderate speed while regulating the speed ratio between the steerable wheels and the unsteerable wheels.

To achieve the second object, according to a sixteenth aspect of the invention, a vehicle comprises: left and right steerable wheels; a fixed displacement hydraulic motor for driving the steerable wheels; left and right unsteerable wheels; a variable displacement hydraulic motor for driving the unsteerable wheels; and a hydraulic pump for supplying oil to the fixed displacement hydraulic motor and the variable displacement hydraulic motor. The displacement of the variable displacement hydraulic motor is changed according to the steered angle of the steerable wheels. Therefore, to regulate the speed ratio between the steerable wheels and the unsteerable wheels during turning of the vehicle so that the vehicle can turn at a moderate speed, the unsteerable wheels are decelerated instead of the steerable wheels being accelerated.

In the sixteenth aspect of the invention, preferably, according to a seventeenth aspect of the invention, the vehicle further comprises a pair of brakes for braking the respective unsteerable wheels. The brakes can be actuated for braking individually. When one of the brakes is actuated for braking, the displacement of the variable displacement hydraulic motor is changed in addition to the change thereof according to the steered angle of the steerable wheels. Therefore, the speed of the vehicle in brake-turn can be further moderated.

Alternatively, to achieve the second object, according to an eighteenth aspect of the invention, a vehicle comprises: left and right steerable wheels; a variable displacement hydraulic motor for driving the steerable wheels; left and right unsteerable wheels; a variable displacement hydraulic motor for driving the unsteerable wheels; and a hydraulic pump for supplying oil to the hydraulic motors. The displacement of at least one of the hydraulic motors is changed according to the steered angle of the steerable wheels. Any of the hydraulic motors may be selectively changed in displacement during turning of the vehicle correspondingly to various conditions.

In the eighteenth aspect, preferably, according to a nineteenth aspect of the invention, the vehicle further comprises a pair of brakes for braking the respective unsteerable wheels. The brakes can be actuated for braking individually. When one of the brakes is actuated for braking, the displacement of at least one of the hydraulic motors is changed in addition to the change of displacement according to the steered angle of the steerable wheels. Any of the hydraulic motors may be selectively changed in displacement during turning and brake-turning of the vehicle correspondingly to various conditions. Further, it is possible to reduce the degree of displacement change of each of the hydraulic motors.

In the nineteenth aspect of the invention, preferably, according to a twentieth aspect of the invention, the displacement of one of the hydraulic motors is changed according to the steered angle of the steerable wheels, and the displacement of the other hydraulic motor is changed when one of the brakes is actuated for braking. Therefore, the degree of displacement change of each of the hydraulic motors corresponding to turning and brake-turning of the vehicle is reduced.

These, further and other objects, features and advantages will appear more fully from the following detailed description with reference to accompanying drawings.

DETAILED DESCRIPTION OF THE INVENTION

Figure 1:
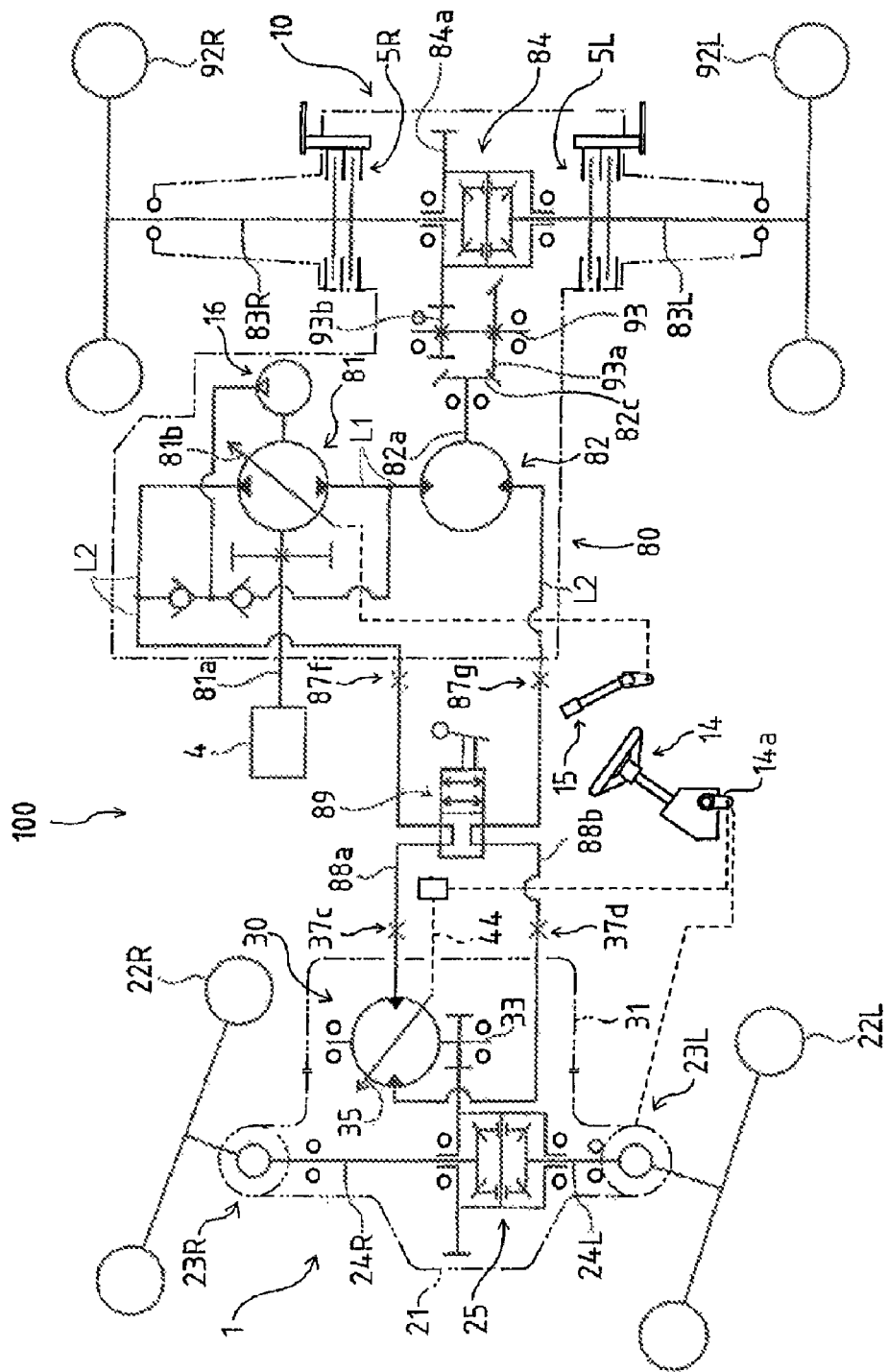
FIG. 1 is a diagram of a four-wheel driving vehicle 100 equipped with an unsteering transaxle 10 and a steering transaxle 1, showing its mechanical and hydraulic structure, wherein a variable displacement hydraulic motor 30 is disposed in steering transaxle 1, and a fixed displacement hydraulic motor 82 in unsteering transaxle 10.

As shown in FIG. 1, a four-wheel driving vehicle 100 is equipped with a steering transaxle 1 and an unsteering transaxle 10. In the following description, for convenience, steering transaxle 1 is referred to as a front transaxle, and unsteering transaxle 10 as a rear transaxle, however, they may be exchanged in the fore-and-aft direction of vehicle 100. The same is said about later-discussed alternative vehicles.

Front steering transaxle 1 incorporates a variable displacement hydraulic motor 30 for driving front steerable wheels 22L and 22R, and rear unsteering transaxle 10 is provided with a fixed displacement hydraulic motor 82 for driving rear unsteerable wheels 92L and 92R. Hydraulic motors 30 and 82 are fluidly connected in tandem to a variable displacement hydraulic pump 81 so as to constitute a hydrostatic transmission (HST) circuit for driving four wheels 22L, 22R, 92L and 92R. Hydraulic pump 81 has a movable swash plate 81b operatively connected to a speed control lever 15 provided on vehicle 100.

An output shaft of an engine 4 is drivingly connected to an input shaft (a pump shaft) 81a of hydraulic pump 81. Pump shaft 81a also serves as a driving shaft of a charge pump 16. Hydraulic pump 81 and motor 82 constitute an HST 80 for driving rear unsteerable wheels 92L and 92R of rear unsteering transaxle 10. HST 80 includes outwardly open ports 87f and 87g fluidly connected to a drive mode switching valve 89 which is shiftable between a two-wheel drive position and a four-wheel drive position. Pipes 88a and 88b are extended from valve 89 to external ports 37c and 37d of front steering transaxle 1 for hydraulic oil supply and delivery to and from hydraulic motor 30.

When valve 89 is set at the two-wheel drive position, ports 87f and 87g are mutually connected so as to make HST 80 into a closed circuit isolated from hydraulic motor 30, thereby transmitting the power of engine 4 to only rear unsteerable wheels 92L and 92R. When valve 89 is set at the four-wheel drive position, ports 87f and 87g are connected to respective pipes 88a and 88b so as to realize the four-wheel driving HST circuit including hydraulic pump 81 and motors 82 and 30, thereby transmitting the power of engine 4 to all wheels 22L, 22R and 92L ad 92R. In other words, HST 80 includes a closed circuit for circulating oil between hydraulic pump 81 and motor 82. The closed circuit includes a pair of lines L1 and L2. One of lines L1 and L2 is interposed between a supply port of hydraulic pump 81 (i.e., one of kidney ports 87a and 87b) and a delivery port of hydraulic motor 82 (i.e., one of kidney ports 87d and 87e), and the other of lines L1 and L2 is interposed between a delivery port of hydraulic pump 81 (i.e., the other of kidney ports 87b and 87a) and a supply port of hydraulic motor 82 (i.e., the other of kidney ports 87e and 87d). Line L1 is entirely disposed in unsteering transaxle 10. Line L2 is partly disposed outside of unsteering transaxle 10. When valve 89 is set at the two-wheel drive position, valve 89 fluidly isolates hydraulic motor 30 from ports 87f and 87g and fluidly connects ports 87f and 87g to each other, thereby completing line L2 interposed between hydraulic pump 81 and motor 82 so that line L2 does not include hydraulic motor 30. When valve 89 is set at the four-wheel drive position, valve 89 fluidly connects supply and delivery ports of hydraulic motor 30 via pipes 88a and 88b to ports 87f and 87g, respectively, thereby completing line L2 interposed between hydraulic pump 81 and motor 82 so that line L2 includes hydraulic motor 30 and pipes 88a and 88b.

HST 80 for driving unsteerable wheels 92L and 92R integrally provided in unsteering transaxle 10 may be alternatively separated from unsteering transaxle 10, or only one of hydraulic pump 81 and motor 82 may be provided in unsteering transaxle 10.

Figure 2:
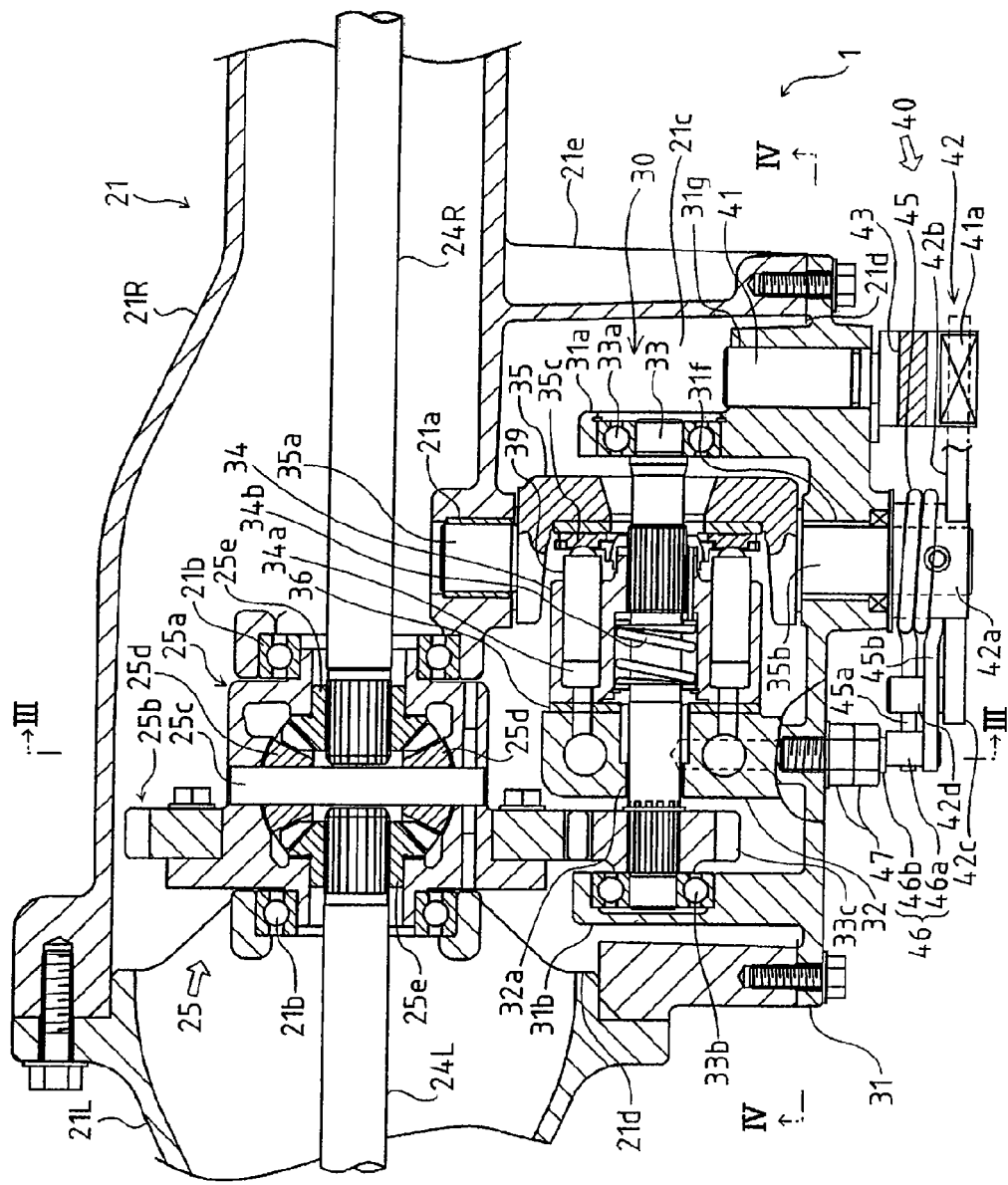
FIG. 2 is a fragmental sectional plan view of steering transaxle 1, showing that variable displacement hydraulic motor 30 supported by a motor support cover 31 is drivingly connected to a differential gear unit 25 in a transaxle casing 21.

As shown in FIGS. 1 and 2, steering transaxle 1 includes a transaxle casing 21 and left and right axle support units 23L and 23R steerably mounted on respective left and right ends of transaxle casing 21. A steering wheel 14 is interlockingly connected to axle support units 23L and 23R so as to steer them. Axle support units 23L and 23R incorporate respective deceleration gear trains (see FIG. 6) and support respective front wheels 22L and 22R drivingly connected to the deceleration gear trains at the outsides thereof so that front wheels 22L and 22R serve as steerable wheels.

Figure 5:
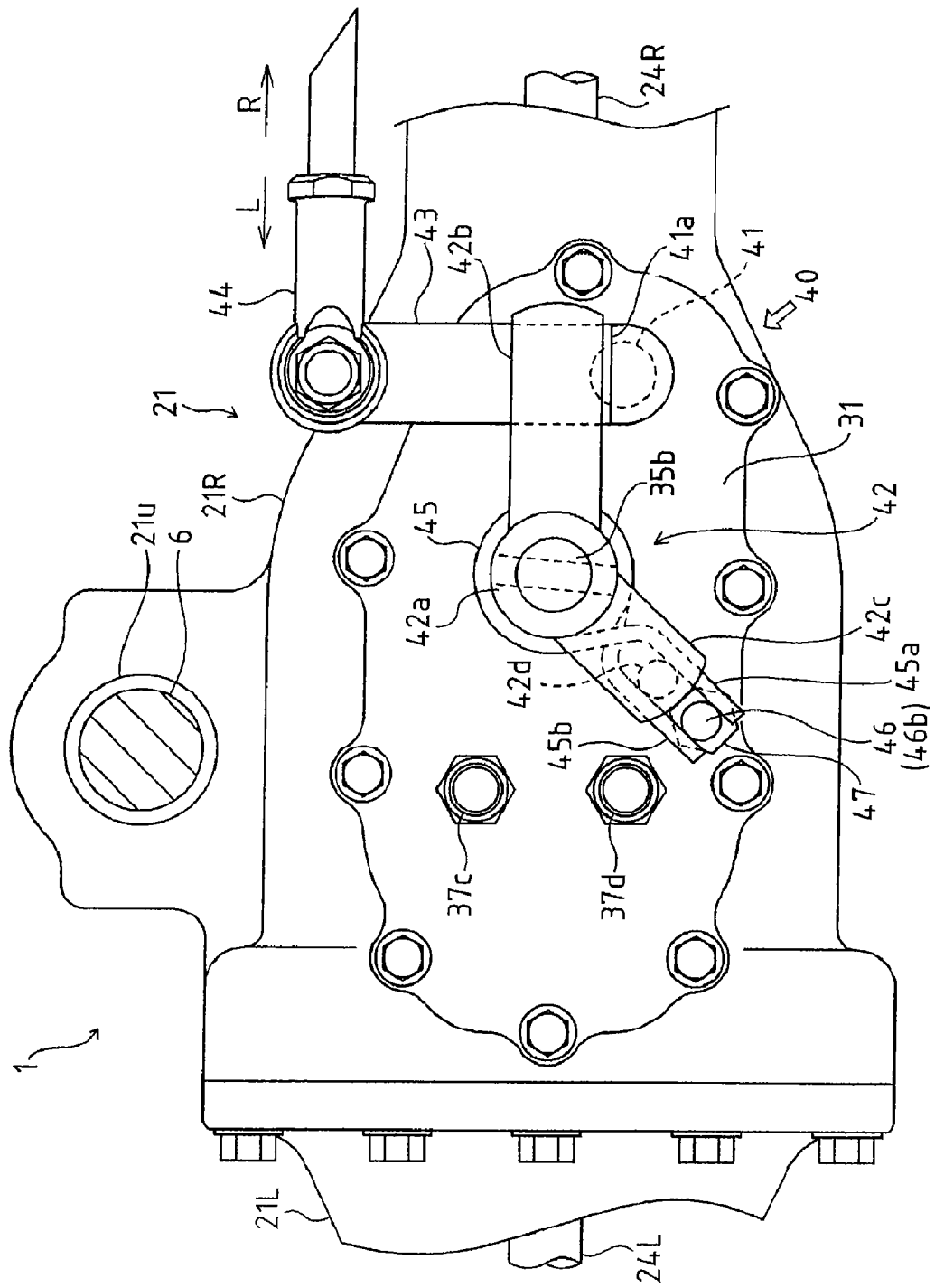
FIG. 5 is the same view as FIG. 4 when transaxle casing 21 is covered with motor support cover 31.

As shown in FIG. 5, transaxle casing 21 consists of a left casing part 21L and a right casing part 21R fastened to each other by bolts. Right casing part 21R is provided at the top portion thereof with a penetrating hole 21u through which a center pin 6 is passed so as to suspend transaxle casing 21 from a chassis of vehicle 100.

As shown in FIGS. 1 and 2, transaxle casing 21 incorporates a differential gear unit 25 and left and right drive shafts 24L and 24R mutually differentially coupled by differential gear unit 25. Transaxle casing 21 has an opening 21d between left and right casing parts 21L and 21R, which is covered with a motor support cover 31. Variable displacement hydraulic motor 30 is fixed onto an inside surface of motor support cover 31 so as to be disposed in transaxle casing 21. A motor control mechanism 40 for controlling the displacement of hydraulic motor 30 (the slant angle of a movable swash plate 35 of hydraulic motor 30), and hydraulic oil ports 37c and 37d for supply and delivery of oil to and from hydraulic motor 30 are provided on an outside surface of motor support cover 31 so as to be exposed to the outside of transaxle casing 21. Hydraulic oil ports 37c and 37d serve as pipe connectors connected to hydraulic oil pipes 88a and 88b.

Hydraulic motor 30, motor control mechanism 40 and hydraulic oil ports 37c and 37d are integrated with motor support cover 31 so as to constitute an assembly unit, which is removed from transaxle casing 21 by removing motor support cover 31 from transaxle casing 21, thereby facilitating their easy maintenance or adjustment. Further, by removing hydraulic motor 30 together with motor support cover 31 from transaxle casing 21, parts including differential gear unit 25 disposed in transaxle casing 21 are exposed so as to facilitate their easy maintenance.

Since the deceleration gear train in each of axle support units 23L and 23R has a large deceleration ratio, hydraulic motor 30 is allowed to have a small displacement. As a result, hydraulic motor 30 can be downsized and lightened, and its motor shaft 33 can be rotated at high speed and low torque by the hydraulic oil reduced in pressure by driving hydraulic motor 82 preceding hydraulic motor 30.

Differential gear unit 25 will be described. As shown in FIG. 2, differential gear unit 25 differentially coupling drive shafts 24L and 24R to each other is disposed in right casing part 21R. Differential gear unit 25 comprises a differential casing 25a, a bull gear 25b, a pinion shaft 25c, bevel pinions 25d and bevel differential side gears 25e. Differential casing 25a is journalled at left and right ends thereof by transaxle casing 21 (right casing part 21R) through respective bearings 21b and relatively rotatably penetrated by drive shafts 24L and 24R at the respective left and right ends thereof. Bull gear 25b is fixed on the outer periphery of differential casing 25a so as to serve as an input gear of differential gear unit 25. Pinion shaft 25c is supported in differential casing 25a perpendicularly to drive shafts 24L and 24R. Pinions 25d are oppositely pivoted on pinion shaft 25c. Each of differential side gears 25e is fixed on each of drive shafts 24L and 24R and disposed in differential casing 25a so as to mesh with both pinions 25d.

Bull gear 25b meshes with a motor gear 33c fixed on motor shaft 33 of hydraulic motor 30 so as to constitute a deceleration gear train between hydraulic motor 30 and differential gear unit 25. Since motor shaft 33 and drive shafts 24L and 24R are parallel, mutually meshing bull gear 25b and motor gear 33c may be inexpensive spur gears or helical gears, and the width of steering transaxle 1 lengthwise of vehicle 100 can be shortened regardless of the length of motor shaft 33.

Figure 4:
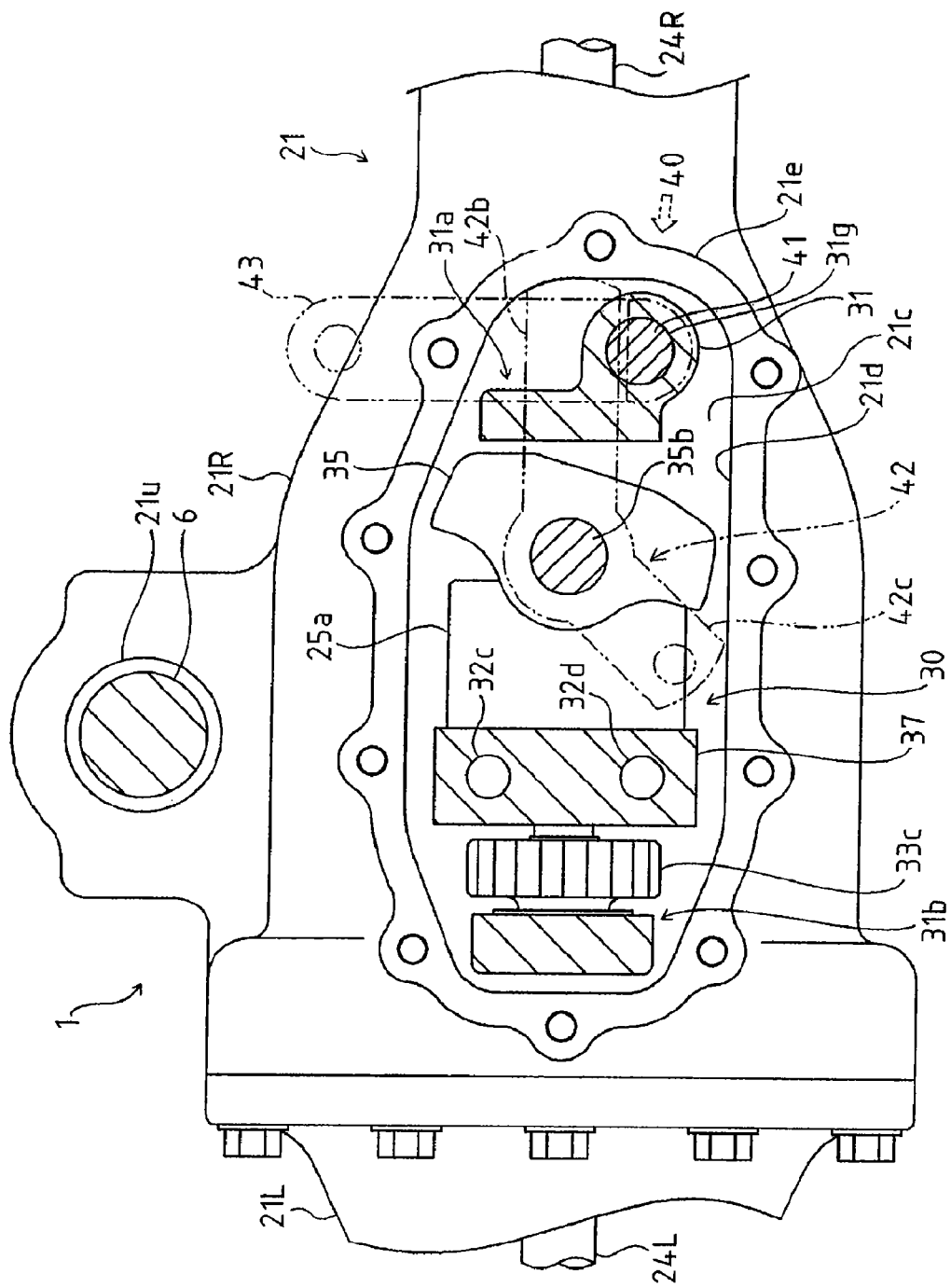
FIG. 4 is a cross sectional view taken along IV-IV line of FIG. 2 when motor support cover 31 is removed from transaxle casing 21.

Hydraulic motor 30 will be described. As shown in FIGS. 2 and 4, right casing part 21R has a portion 21e projecting rearward behind differential gear unit 25 such as to form a motor chamber 21c therein. Opening 21d is provided at the rear end of portion 21e so as to open motor chamber 21c.

Figure 3:
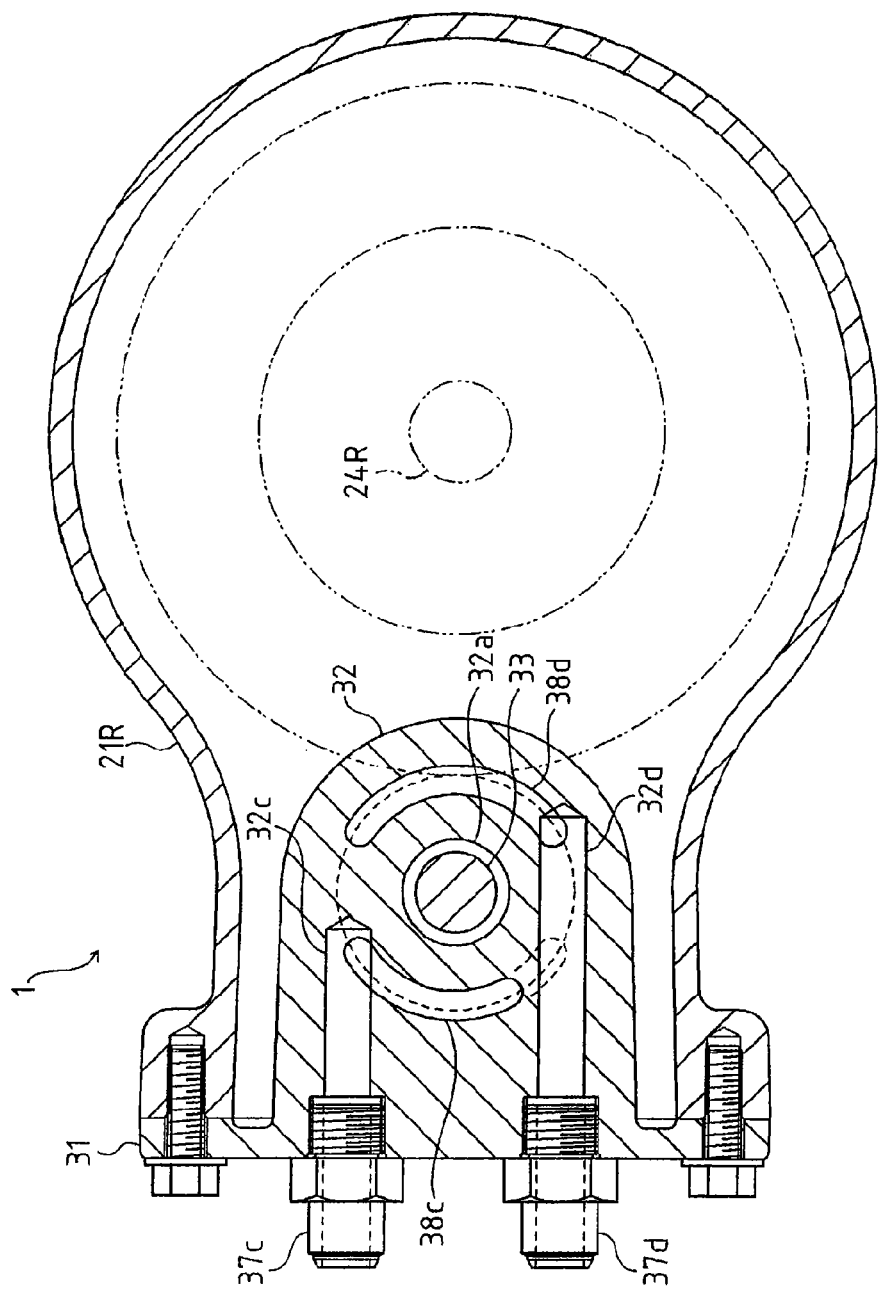
FIG. 3 is a cross sectional view taken along III-III line of FIG. 2.

As shown in FIGS. 2 and 3, a center section 32 is integrally formed of motor support cover 31. Hydraulic motor 30 is mounted on the inside surface of center section 32, and hydraulic oil ports 37c and 37d on the outside surface of center section 32.

Movable swash plate 35 has front and rear trunnion shaft shafts 35a and 35b. Trunnion shaft 35a is rotatably supported by transaxle casing 21 (right casing part 21R), and trunnion shaft 35b by motor support cover 31.

The interior space of transaxle casing 21 is filled with oil so as to be tightly fluidly isolated from the outside of transaxle casing 21, including motor chamber 21c covered with motor support cover 31, but excluding hydraulic oil ports 37c and 37d.

Left and right bearing support walls 31a and 31b are integrally formed of motor support cover 31 so as to project in parallel with center section 32 therebetween. Bearings 33a and 33b are fitted in respective bearing support walls 31a ad 31b so as to journal left and right ends of motor shaft 33. Center section 32 has a central axial penetrating hole 32a through which motor shaft 33 is rotatably passed at its intermediate portion.

As shown in FIGS. 2 and 3, center section 32 is formed therein with upper and lower oil passages 32c and 32d. Ports 37c and 37d are fitted onto respective outer ends of oil passages 32c and 32d. Center section 32 is also formed therein with kidney ports 38c and 38d open at a right surface thereof in communication with respective oil passages 32c and 32d.

As shown in FIG. 2, a cylinder block 34 is disposed between center section 32 and bearing support wall 31a, and slidably rotatably fitted to center section 32 through a valve plate 36 so as to be fluidly connected to kidney ports 38c and 38d. Cylinder block 34 is not-relatively rotatably fitted on motor shaft 33, which serves as the rotary center axis of cylinder block 34.

Pistons 39 are reciprocally fitted in cylinder block 34 around motor shaft 33, and a spring 34b is wound around motor shaft 33 in cylinder block 34 so as to bias cylinder block 34 toward center section 32.

Movable swash plate 35 freely penetrated by motor shaft 33 is disposed between cylinder block 34 and bearing support wall 31a, and pivotally supported on cylinder block 34. Movable swash plate 35 has a thrust bearing 35c fitting heads of pistons 39. By rotating movable swash plate 35 around trunnion shafts 35a and 35b, strokes of pistons 39 are changed so as to change the displacement of hydraulic motor 30.

As shown in FIG. 2, motor gear 33c meshing with bull gear 25b of differential gear unit 25 is disposed between center section 32 and bearing support wall 31b.

Transaxle casing 21 (right casing part 21R) is formed with a boss 21a between motor chamber 21c and the chamber incorporating drive shaft 24R in front thereof. When motor support cover 31 is fitted onto transaxle casing 21 (right casing part 21R), trunnion shaft 35a is rotatably fitted into boss 21a, thereby easily locating hydraulic motor 30 in transaxle casing 21 (casing part 21R).

Motor control mechanism 40 for controlling the displacement of hydraulic motor 30 will be described. As shown in FIGS. 2, 4 and 5, motor control mechanism 40 provided on motor support cover 31 is disposed on the proximal (rear) side of transaxle casing 21 in the longitudinal direction of vehicle 100 so as to be prevented from colliding with obstacles during forward traveling of vehicle 100.

To ensure a good balance or compactness, a tie rod and a linkage from steering wheel 14 (such as a power steering cylinder) are appreciated to be disposed opposite to motor control mechanism 40 with respect to transaxle casing 21.

Therefore, the tie rod and the linkage from steering wheel 14 come into a space in front of transaxle casing 21, i.e., on the distal side of transaxle casing 21 in the longitudinal direction of vehicle 100. Alternatively, if protection of the tie rod and the like is preferred to that of motor control mechanism 40, they may be disposed behind transaxle casing 21 (on the proximal side of transaxle casing 21 in the longitudinal direction of vehicle 100), and motor control mechanism 40 with motor support cover 31 in front of transaxle casing 21 (on the distal side of transaxle casing 21 in the longitudinal direction of vehicle 100). Motor support cover 31 may be also disposed at the front surface of transaxle casing 21 if an engine oil pan or a linkage for suspending a mid-mount working machine, e.g., a mower, must be disposed behind transaxle casing 21. The same is said about later-discussed various alternative steering transaxles.

As shown in FIGS. 2 and 5, trunnion shaft 35b supported by motor support cover 31 projects at its rear end rearward from motor support cover 31. A control lever 42 has a boss portion 42a fixed on the rear end of trunnion shaft 35b. Doglegged control lever 42 includes a first arm 42b extended rightward from boss portion 42a, and a second arm 42c extended downwardly leftward from boss portion 42a.

On the right side of trunnion shaft 35b, motor support cover 31 is bored by a penetrating hole 31g through which a camshaft 41 is rotatably passed. A rear end of camshaft 41 projects rearward from motor support cover 31 and its upper portion is cut away so as to form its lower portion into a semicircular cam 41a having a flat surface and left and right angled ends of the flat surface. The angled ends serve as cam profiles of cam 41a.

An arm 43 is fixed at its bottom end to camshaft 41 in front of cam 41a. A link rod 44 is pivotally connected at one end thereof to a top end of arm 43. Link rod 44 is connected at the other end thereof to an active portion of a linkage between steering wheel 14 and steerable wheels 22L and 22R. As shown in FIG. 1, for example, an arm 14a rotated according to the rotation of steering wheel 14 may be operatively connected link rod 44. Alternatively, link rod 44 may be connected to a steerable portion (such as a later-discussed steered casing 23b) of one of axle support units 23L and 23R.

Referring to FIG. 5, when vehicle 100 travels straight, the flat surface of semicircular cam 41a is disposed horizontally and first arm 42b of control lever 42 is put on the flat surface of cam 41a. When vehicle 100 turns either left or right so as to move link rod 44 rightward (as expressed by an arrow R in FIG. 5), arm 43 rotates clockwise so as to raise the left cam profile of cam 41a, thereby pushing up first arm 42b. Therefore, control lever 42 is rotated counterclockwise so as to rotate movable swash plate 35 in the direction for reducing its slant angle, i.e., for reducing the displacement of hydraulic motor 30 (for increasing the rotary speed of hydraulic motor 30).

If the turning direction of vehicle 100 is the other of left and right such as to move link rod 24 leftward (as expressed by an arrow L in FIG. 5), arm 43 rotates counterclockwise so as to raise the right cam profile of cam 41a, thereby pushing up first arm 42b and rotating control lever 42 counterclockwise. Consequently, whether vehicle 100 turns left or right, swash plate 35 rotates in the direction for reducing its slant angle, i.e., for reducing the displacement of hydraulic motor 30 (for increasing the rotary speed of hydraulic motor 30).

As shown in FIGS. 2 and 5, a torque spring 45 is wound around boss portion 42a of control lever 42 so as to bias control lever 42 toward its initial position defining the maximum slant angle of movable swash plate 35, i.e., the maximum displacement of hydraulic motor 30. Both end portions 45a and 45b of spring 45 are twisted to cross each other and extended so as to pinch pins 42d and 46. Pin 42d projects from second arm 42c of control lever 42. If control lever 42 is rotated for reducing the slant angle of swash plate 35, i.e., reducing the displacement of hydraulic motor 30, pin 42d pushes one of end portions 45a and 45b of spring 45 away from the other retained by pin 46, thereby causing the biasing force of spring 45 for returning control lever 42 to the initial position.

Pin 46 has a pivot portion 46a planted in motor support cover 31 and an eccentric portion 46b. Correctly, the portion of pin 46 pinched by end portions 45a and 45b of spring 45 is eccentric portion 46b. Pivot portion 46a is screwed into motor support cover 31 and fastened to motor support cover 31 by nuts 47. By loosening nuts 47, pivot portion 46a can be rotated relative to motor support cover 31 so as to revolve eccentric portion 46b around pivot portion 46a, thereby adjusting the initial position of control lever 42.

Each of symmetric axle support units 23L and 23R will be described with reference to representing right axle support unit 23R shown in FIG. 6. Each of axle support units 23L and 23R includes a kingpin casing 23a, a steered casing 23b and an axle casing 23c. Kingpin casing 23a is fixed to an outer end of each of transaxle casings 21L and 21R and bent downward. Steered casing 23b is relatively rotatably disposed around the downwardly extending portion of kingpin casing 23a. Upper and lower bearings 51a and 51b are interposed between kingpin casing 23a and steered casing 23b therearound. Steered casing 23b has a vertically cut open surface to which a bowl-like axle casing 23c is jointed.

In the bent portion of kingpin casing 23a, a bevel gear 52a is formed on the outer end of each of drive shafts 24L and 24R. A transmission shaft 52 is disposed on the central axis of the downwardly extending portion of kingpin casing 23a. A bevel gear 52b fixed on the top end of transmission shaft 52 is rotatably supported by kingpin casing 23a through a bearing 51c, and meshes with bevel gear 52a. Transmission shaft 53 projects downward from the bottom end of the downwardly extending portion of kingpin casing 23a so as to be fixedly provided on its bottom end with a bevel gear 52c and rotatably supported on a bottom portion of steered casing 23b through a bearing 51d.

Bevel gear 52c meshes with a large bevel final gear 52d fixed on an axle 53. Mutually joined steered casing 23b and axle casing 23c enclose final gear 52d. Final gear 52d is rotatably supported through a bearing 51c by steered casing 23b, and through a bearing 51f by axle casing 23c. An outer portion of axle 54 projecting outward from axle casing 23c is formed into a flange 55 to be fixed to each of wheels 22L and 22R.

In this way, gears 52a, 52b, 52c and 52d in each of axle support units 23L and 23R decelerate the output rotation of hydraulic motor 30 transmitted to axle 54 of each of steerable wheels 22L and 22R through each of drive shafts 24L and 24R and transmission shaft 53. Such an arrangement of deceleration gears in axle support units 23L and 23R allow reduction of the displacement of hydraulic motor 30, which enables high-speed and low-torque rotation of hydraulic motor 30 for saving load on hydraulic pump 81, and facilitates compactness of transaxle casing 21 disposed just below the vehicle chassis.

At least one of steered casings 23b (or axle casings 23c) is operatively connected to steering wheel 14. Steering casings 23b of both axle support units 23L and 23R are mutually connected by a tie rod. Steered casing 23b of either axle support unit 23L or 23R may serve as the above-mentioned active portion to be operatively connected to arm 43 through link rod 44 so as to change the displacement of hydraulic motor 30 in association with the operation of steering wheel 14.

Figure 7:
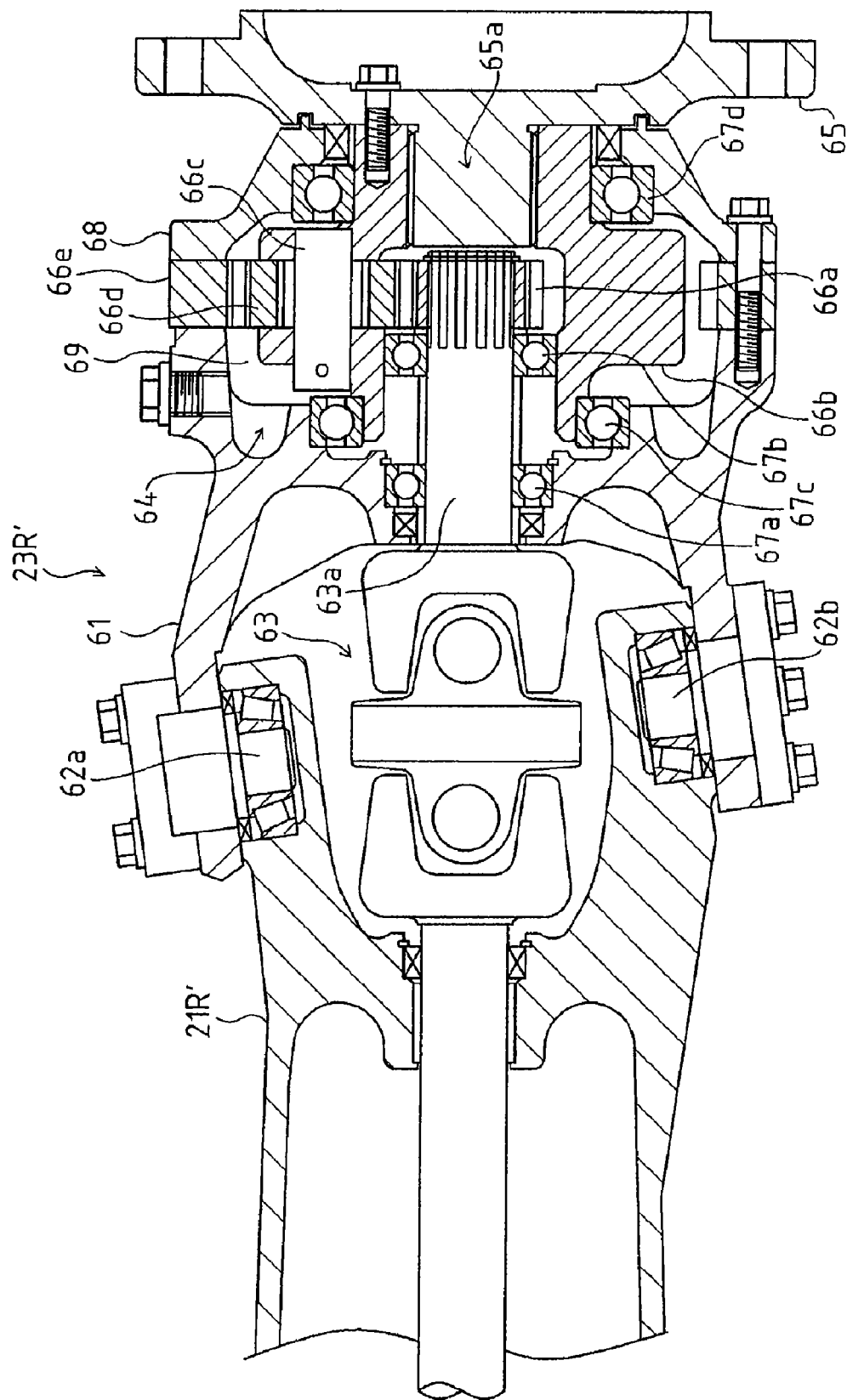
FIG. 7 is a sectional rear view of an alternative right axle support unit 23R' attached to a right end of an alternative right casing part 21R' of transaxle casing 21.

FIG. 7 illustrates an alternative right casing part 21R' of transaxle casing 21 and an alternative right axle support units 23R'. They represent respective alternative left ones provided in the left portion of transaxle casing 21, which are laterally symmetric with the illustrated right ones. A steered casing 61 is laterally rotatably fitted onto an outer end portion of right casing part 21R' of transaxle casing 21 through upper and lower coaxial kingpins 62a and 62b. A bearing casing 68 and steered casing 61 with a ring gear 66e therebetween are fastened together by bolts so as to enclose a space 69 for incorporating a planetary gear mechanism 64 including ring gear 66e.

Planetary gear mechanism 64 comprises a sun gear 66a, a planetary gear (or planetary gears) 66d and a carrier 66b in addition to ring gear 66e. Sun gear 66a is fixed on a distal end of sun gear shaft 63a rotatably supported by steered casing 61 through a bearing 67a, and by carrier 66b through a bearing 67b. Between steered casing 61 and casing part 21R', a universal joint 63 couples sun gear shaft 63a to drive shaft 24R. The bending pivot point between sun gear shaft 63a and drive shaft 24R is disposed between upper and lower kingpins 62a and 62b.

Carrier 66b surrounding sun gear 66a and sun gear shaft 63a is rotatably supported by steered casing 61 through a bearing 67c, and by bearing casing 68 through a bearing 67d. Planetary gear (gears) 66d is (are) pivoted by carrier 66b through a pivot pin (respective pivot pins) 66c. Planetary gear (gears) 66d meshes (mesh) with sun gear 66a and an internal gear formed on the inner periphery of ring gear 66e. A flange 65 to be fixed to each of steerable wheels 22L and 22R is rotatably fitted on an outer end of steered casing 68. Flange 65 has an axle portion 65a axially fitted into carrier 66b and fastened to carrier 66b by a bolt (or bolts).

In this way, carrier 66d fixed to flange 65 and each of wheels 22L and 22R is rotated by revolution of planetary gear (gears) 66d around sun gear 66a that is being rotated by each of drive shafts 24L and 24R.

At least one of steered casings 61 is operatively connected to steering wheel 14. Steering casings 61 are mutually connected by a tie rod. One of steered casings 61 may serve as the above-mentioned active portion to be operatively connected to arm 43 through link rod 44 so as to change the displacement of hydraulic motor 30 in association with the operation of steering wheel 14.

Figure 6:
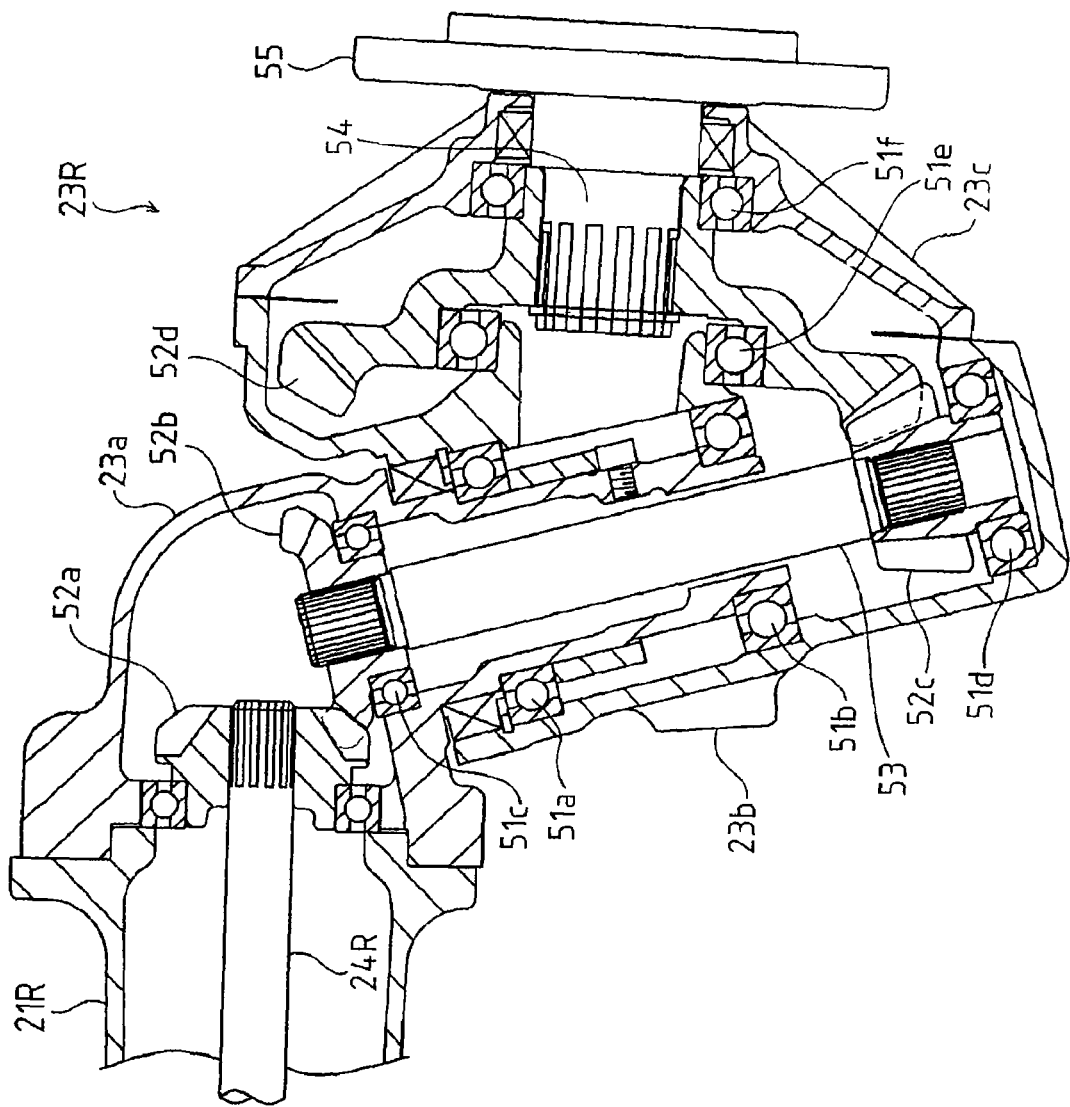
FIG. 6 is a sectional rear view of a right axle support unit 23R attached to a right end of a right casing part 21R of transaxle casing 21.

When the axle supporting structure shown in FIG. 6 is employed, axles (central axes) of steerable wheels 22L and 22R are disposed lower than drive shafts 24L and 24R. When the axle supporting structure shown in FIG. 7 is employed, axles (central axes) of steerable wheels 22L and 22R are disposed as high as drive shafts 24L and 24R. Any of the two structures may be selected at need.

Figure 8:
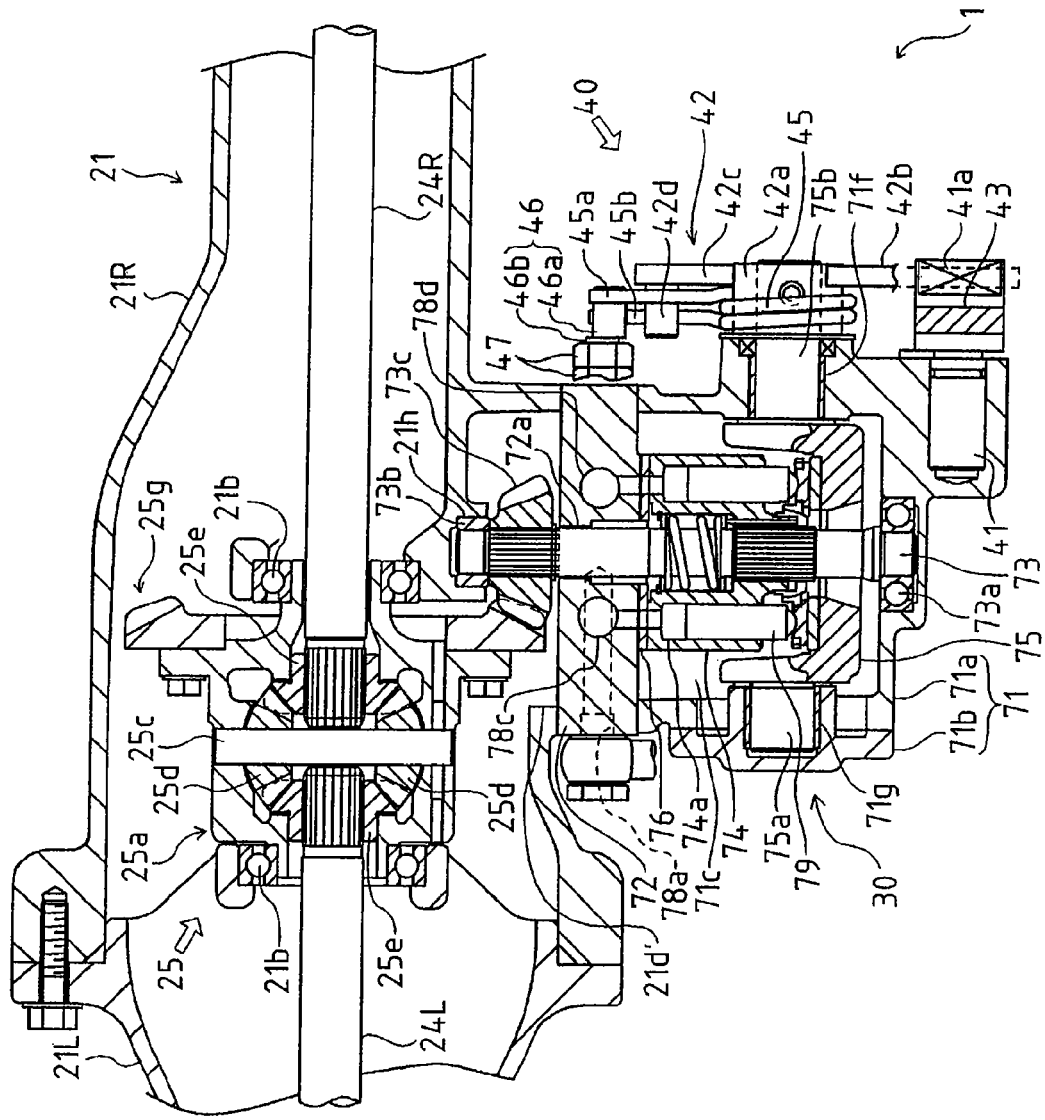
FIG. 8 is a fragmental sectional plan view of steering transaxle 1, showing that variable displacement hydraulic motor 30 supported by an alternative motor support cover 71 is drivingly connected to differential gear unit 25 in transaxle casing 21.

FIG. 8 illustrates variable displacement hydraulic motor 30 in an alternative motor support cover 71 attached to transaxle casing 21. Unless being specified, parts and members designated by the same reference numerals as those of FIG. 2 are identical in structure or function to those of FIG. 2.

Motor support cover 71 supporting hydraulic motor 30 is fastened to transaxle casing 21 through a center section 72 of hydraulic motor 30. A movable swash plate 75 of hydraulic motor 30 has trunnion shafts 75a and 75b rotatably supported by motor support cover 71. Trunnion shafts 75a and 75b are disposed in parallel to drive shafts 24L and 24R.

Motor support cover 71 includes a casing part 71a and a casing cover part 71b. Casing part 71a is penetrated by a hole 71*f* into which trunnion shaft 75*b* is rotatably fitted. Casing cover part 71*b* having a recess 71*g*, into which trunnion shaft 75*a* is rotatably fitted, is fixedly fitted onto an (left) open side surface of casing part 71*a* so that casing part 71*a* and casing cover part 71*b* encloses a motor chamber 71*c* for incorporating hydraulic motor 30. By removing casing cover part 71*b* from casing part 71*a*, the open side surface of casing part 71*a* is exposed so as to facilitate disassembly of hydraulic motor 30.

Hydraulic motor 30 has a motor shaft 73 perpendicular to drive shafts 24L and 24R. Motor shaft 73 is rotatably passed through a penetrating hole 72*a* of center section 72. Motor shaft 73 is journalled at its rear end by cover part 71*a* through a bearing 73*a*. A front end of motor shaft 73 is rotatably fitted into a boss portion 21*h* formed in transaxle casing 21 (right casing part 21R) through a bearing collar 73*b*. A motor gear 73*c* is fixed on motor shaft 73 between bearing collar 73*b* and center section 72. Differential gear unit 25 has an alternative bevel bull gear 25*g* fixed on differential casing 25*a* meshing with motor gear 73*c*.

Center section 72 is a member separated from motor support cover 71 and transaxle casing 21 (right casing part 21R) and fixedly sandwiched between motor support cover 71 and casing part 21R. Hydraulic oil passages 78*c* and 78*d* are bored in center section 72, and hydraulic oil ports 78*a* serving as pipe connectors are externally fitted on center section 72 so as to communicate with respective passages 78*c* and 78*d*.

A cylinder block 74 is not-relatively rotatably fitted on motor shaft 73 serving as the rotary center axis of cylinder block 74, and slidably rotatably fitted to the rear end of center section 72 through a valve plate 76. Pistons 79 are reciprocally fitted into respective cylinder holes 74*a* formed in cylinder block 74. Hydraulic oil passages 78*c* and 78*d* fluidly communicate with cylinder holes 74*a* through valve plate 76. Heads of pistons 79 project rearward from cylinder block 74 and abut against movable swash plate 75 therebehind. Motor shaft 73 is freely passed through movable swash plate 75.

Motor control mechanism 40 including camshaft 41 and control lever 42, similar to that of FIG. 2, is provided on casing part 71*a* of motor support cover 71. However, since trunnion shaft 75*b* serving as the rotary center shaft of control lever 42 is disposed in parallel to drive shafts 24L and 24R, camshaft 41 also becomes parallel to drive shafts 24L and 24R. Therefore, arm 43 fixed on camshaft 41 is rotatable perpendicularly to drive shafts 24L and 24R (lengthwise of vehicle 100). Arm 43 may be interlockingly connected to any active portion of the linkage between steering wheel 14 and each of steerable wheels 22L and 22R. The only important function for arm 43 is to transmit the degree of left and right turning of steerable wheels 22L and 22R.

Hydraulic motor 30 including center section 72, and motor control mechanism 40 are integrated with motor support cover 71 so as to be made into an assembly unit, thereby facilitating their easy maintenance or adjustment. When this assembly unit is assembled with transaxle casing 21, center section 72 is fixedly fitted onto the rear end of right casing part 21R so as to cover an opening 21*d'* formed in right casing part 21R. The front end of motor shaft 73 is inserted into boss portion 21*h* of casing part 21R through bearing collar 73*b*, thereby easily drivingly connecting hydraulic motor 30 to differential gear unit 25. By separating center section 72 from casing part 21R, hydraulic motor 30 together with motor support cover 71 can be easily removed from transaxle casing 21.

To ensure a good balance or compactness, the tie rod and the linkage from steering wheel 14 are preferably disposed opposite to motor support cover 71 with respect to transaxle casing 21, i.e., in front of transaxle casing 21. Alternatively, if the tie rod, an engine oil pan, a linkage for supporting a mid-mount working machine or so on must be disposed behind transaxle casing 21, motor support cover 71 with motor control mechanism 40 may be disposed in front of transaxle casing 21.

Figure 9:
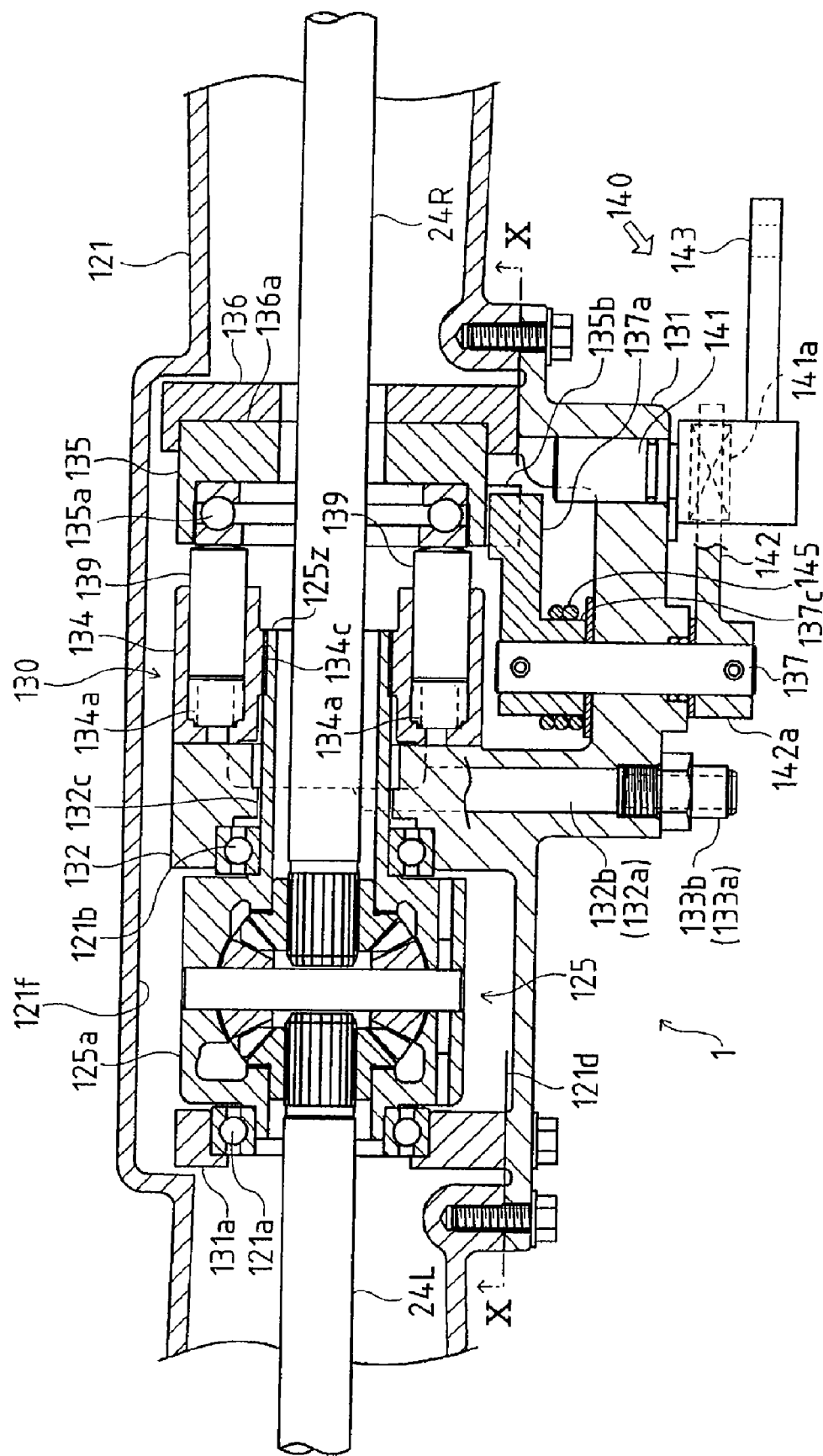
FIG. 9 is a fragmental sectional plan view of steering transaxle 1, showing that an alternative variable displacement hydraulic motor 130 supported by an alternative motor support cover 131 is drivingly connected to an alternative differential gear unit 125 in an alternative transaxle casing 121.
Figure 10:
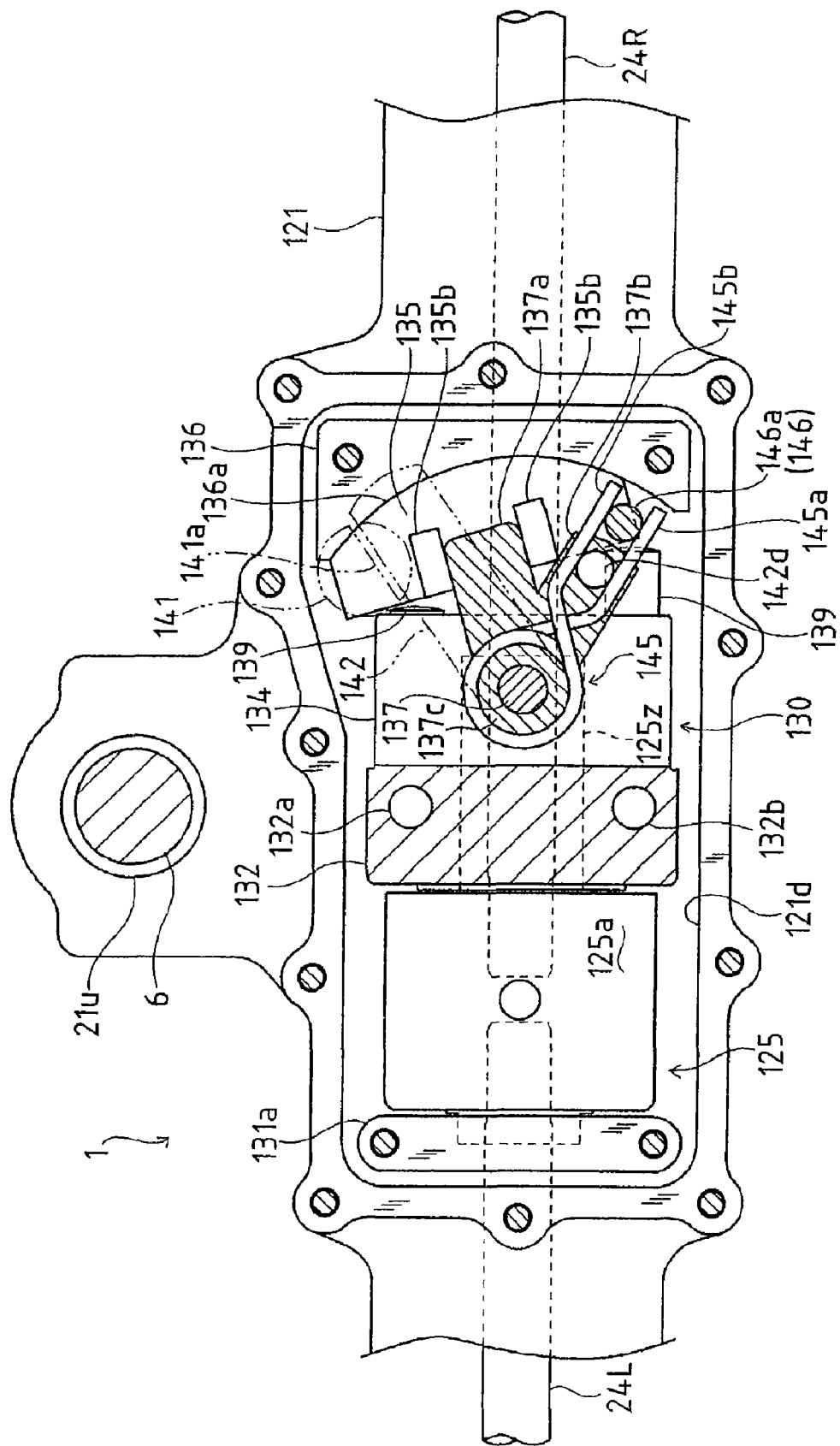
FIG. 10 is a cross sectional view taken along IX-IX line of FIG. 9.

FIGS. 9 and 10 illustrate steering transaxle 1 having an alternative transaxle casing 121 incorporating an alternative hydraulic motor 130 and an alternative differential gear unit 125. Transaxle casing 121 has a rear opening 121*d* covered with a motor support cover 131. As shown in FIG. 9, transaxle casing 121 has a front wall 121*f* toward which a center section 132 integrally formed of motor support cover 131 is extended. In transaxle casing 121, hydraulic motor 130 and differential gear unit 125 are distributed right and left, opposite to each other, with respect to center section 132.

Center section 132 has a penetrating hole 132*c* through which drive shaft 24R is freely passed. Further, drive shaft 24R is disposed on the center axis of cylinder block 134 of hydraulic motor 130 and freely penetrates cylinder block 134, a movable swash plate 135, and a guide block 136 supporting movable swash plate 135.

Differential gear unit 125 includes a differential casing 125*a*. A boss portion 125*z* is integrally formed on the right end of differential casing 125*a*, and extended into penetrating hole 132*c* around drive shaft 24R so as to rotatably fit center section 132 through a bearing 121*b*. Differential casing 125*a* is journalled at the left end thereof by a bearing 121*a* which is fitted in a support block 131*a* fastened to motor support cover 131 by a bolt. Boss portion 125*z* surrounding drive shaft 24R projects rightward from penetrating hole 132*c*. Boss portion 125*z* is spline-fitted into a center axial hole 134*c* of cylinder block 134 slidably rotatably fitted onto the right surface of center section 132, thereby serving as an axial motor shaft of hydraulic motor 130. In this way, differential casing 125*a* is rotatable integrally with cylinder block 134. Further, differential casing 125*a* and hydraulic motor 130 are disposed coaxially around drive shaft 24R so as to facilitate compactness of steering transaxle 1.

Upper and lower hydraulic oil passages 132*a* and 132*b* are bored in center section 132, and outwardly open at a rear surface of motor support cover 131. Hydraulic oil ports 133*a* and 133*b* serving as pipe connectors are externally fitted on the rear surface of motor support cover 131 so as to communicate with respective passages 132*a* and 132*b*.

Parallel cylinder holes 134*a* are bored in cylinder block 134 around center axial hole 134*c*. Pistons 139 are reciprocally fitted into respective cylinder holes 134*a* and abut at head thereof against a thrust bearing 135*a* of movable swash plate 135. Guide block 136 fixed to motor support cover 131 has an arcuate guide surface 136*a* to which movable swash plate 135 is slidably fitted. In this way, movable swash plate 135 is made as a cradle type.

Hydraulic motor 130 is provided with a motor control mechanism 140 assembled with motor support cover 131. Referring to motor control mechanism 140, upper and lower projections 135*b* are formed on the rear end of movable swash plate 135, as shown in FIG. 10. An arm 137*a* is clamped at one end thereof between projections 135*b*. Arm 137*a* is disposed perpendicular to drive axles 24L and 24R and rotatably supported by motor support cover 131. The other end of arm 137*a* is formed into a boss fixed on an inner front end portion of a control shaft 137. By rotating control shaft 137, arm 137*a* is rotated together with control shaft 137 so as to change the slant angle of movable swash plate 135, thereby changing the displacement of hydraulic motor 130.

A torque spring 145 is wound around the boss of arm 137a on control shaft 137. A second arm 137b is branched from arm 137a, and a pin 142d projects from second arm 137b. Both end portions 145a and 145b are twisted to cross each other and extended to clamp pin 142d and an eccentric portion 146b of a retaining pin 146 when movable swash plate 135 is disposed at its initial position for defining the maximum displacement of hydraulic motor 130. If control shaft 137 is rotated for reducing the displacement of hydraulic motor 130, pin 142d of arm 137b rotating together with control shaft 137 pushes one of end portions 145a and 145b away from the other end portion 145b or 145a retained by eccentric portion 146a of retaining pin 146 so as to generate the biasing force of spring 145 for returning movable swash plate 135 to its initial position for ensuring the maximum displacement of hydraulic motor 130.

Retaining pin 146 has a pivot portion pivotally planted in motor support cover 131. Eccentric portion 146a is eccentrically extended from the pivot portion. The pivot portion of retaining pin 146 is normally fastened to motor support cover 131 by a nut, for example. By loosening the nut and letting the pivot portion rotate relative to motor support cover 131, eccentric portion 146a revolves around the pivot portion so as to adjust the initial position of arm 137a with movable swash plate 135.

A boss portion 142a of a control arm 142 is fixed on the rear end of control shaft 137 behind motor support cover 131. A camshaft 141 is disposed in parallel to control shaft 137 and rotatably supported by motor support cover 131. The rear end of camshaft 141 projecting rearward from motor support cover 131 is formed into a semicircular cam 141a whose flat surface confronts an upper edge of control arm 142. An arm 143 is fixed on camshaft 141. Arm 143 may be interlockingly connected to any active portion of the linkage between steering wheel 14 and each of wheels 22L and 22R if arm 143 is rotated accordingly to the degree of left and right turning of wheels 22L and 22R.

In this way, motor control mechanism 140, including arms 137a and 137b, control shaft 137, control arm 142, camshaft 141 and arm 143, is assembled together with motor support cover 131 and hydraulic motor 130. Such a resultant assembly unit can be easily attached or removed to and from transaxle casing 121.

Cylinder block 134 having center axial hole 134c for passing boss portion 125z of differential casing 125a and drive shaft 24R becomes diametrically large so as to be reduced in rotary speed, thereby saving the size or parts count of a deceleration gear for ensuring a deceleration ratio between hydraulic motor 130 and axles of steerable wheels 22L and 22R.

Incidentally, as shown in FIG. 10, transaxle casing 121 has hole 21u through which center pin 6 is passed for hanging down steering transaxle 1 from a chassis of vehicle 100.

Figure 11:
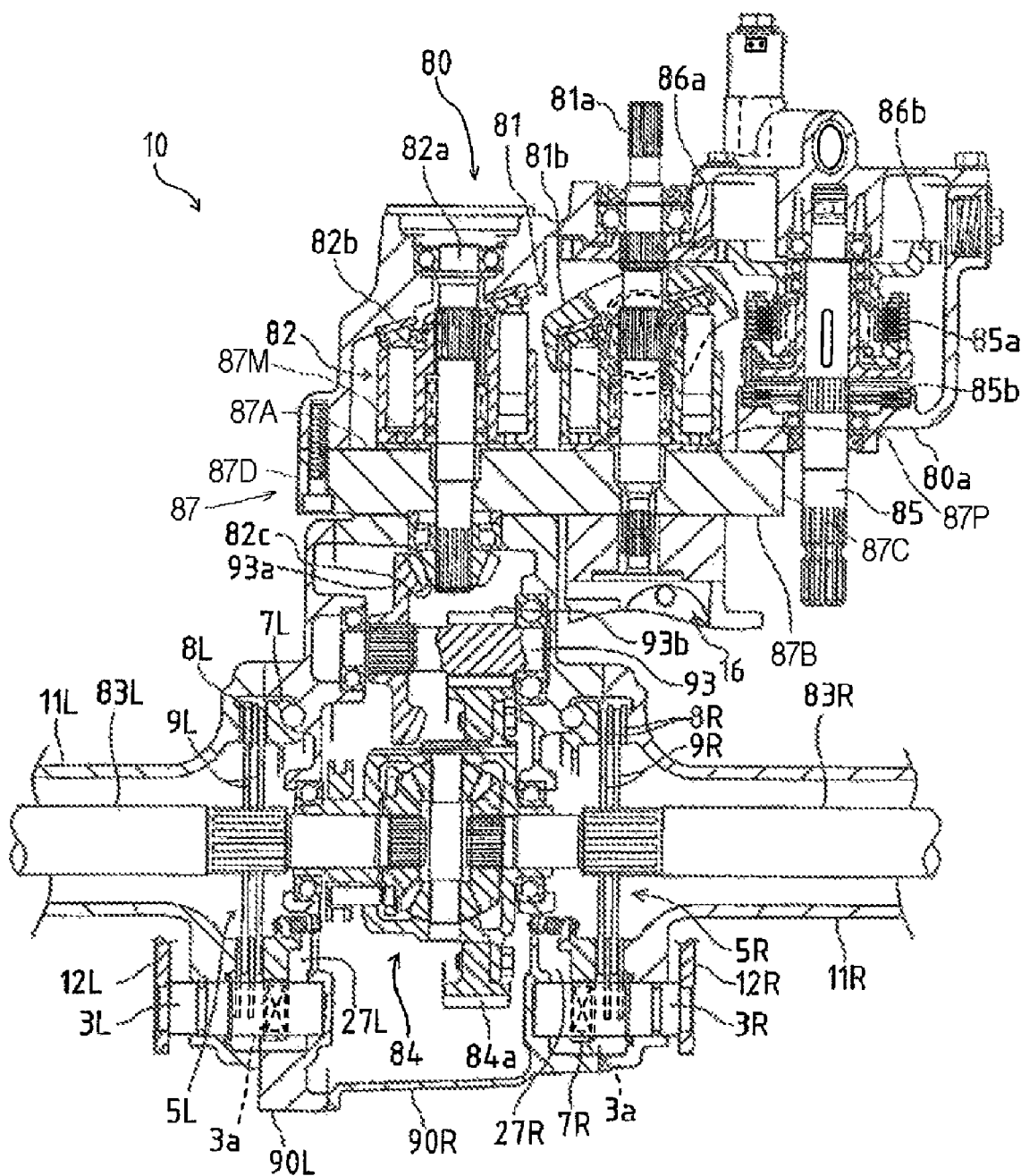
FIG. 11 is a sectional view of unsteering transaxle 10 with an HST 80.

Unsteering transaxle (main transaxle) 10 integrally provided with HST 80 including mutually fluidly connected hydraulic pump 81 and motor 82 will now be described with reference to FIGS. 1, 11 and 12. A casing of unsteering transaxle 10 is divided into an HST casing 80a and a differential gear casing 90R by a plate-like center section 87 having opposite outer surfaces 87A and 87B, so that HST casing 80a is attached to outer surface 87A, and differential gear casing 90R is attached to outer surface 87B. Center section 87 is formed with outer surfaces 87C, 87D and 87E, which are disposed at respective ends of outer surfaces 87A and 87B and extended between outer surfaces 87A and 87B. Outer surfaces 87C and 87D are opposite to each other, and outer surface 87E is extended between outer surfaces 87C and 87D.

HST casing 80a incorporates HST 80 including hydraulic pump 81 and motor 82 slidably rotatably fitted onto a pump mounting surface 87P and a motor mounting surface 87M, respectively, and pump and motor mounting surfaces 87P and 87M are formed on outer surface 87A of center section 87. Outer surface 87C is closer to pump mounting surface 87P than motor mounting surface 87M, and outer surface 87D is closer to motor mounting surface 87M than pump mounting surface 81P. Hydraulic pump 81 has movable swash plate 81b operatively connected to speed control lever 15. Hydraulic pump 81 has axial pump shaft 81a, which is extended perpendicular to outer surfaces 87A and 87B, is freely passed through movable swash plate 81b and projects outward from HST casing 80a to be drivingly connected to engine 4. Pump shaft 81a is journalled by HST casing 80a and center section 87. Pump shaft 81a penetrates center section 87 from outer surface 87A to outer surface 87B and extends outward from outer surface 87B, opposite to HST casing 80a and adjacent to differential gear casing 90R so as to serve as the drive shaft of charge pump 16, which is fitted to outer surface 87B and disposed opposite to hydraulic pump 81 with respect to center section 87. Hydraulic motor 82 has axial motor shaft 82a disposed in parallel to pump shaft 81a and journalled by HST casing 80a and center section 87.

Figure 12:
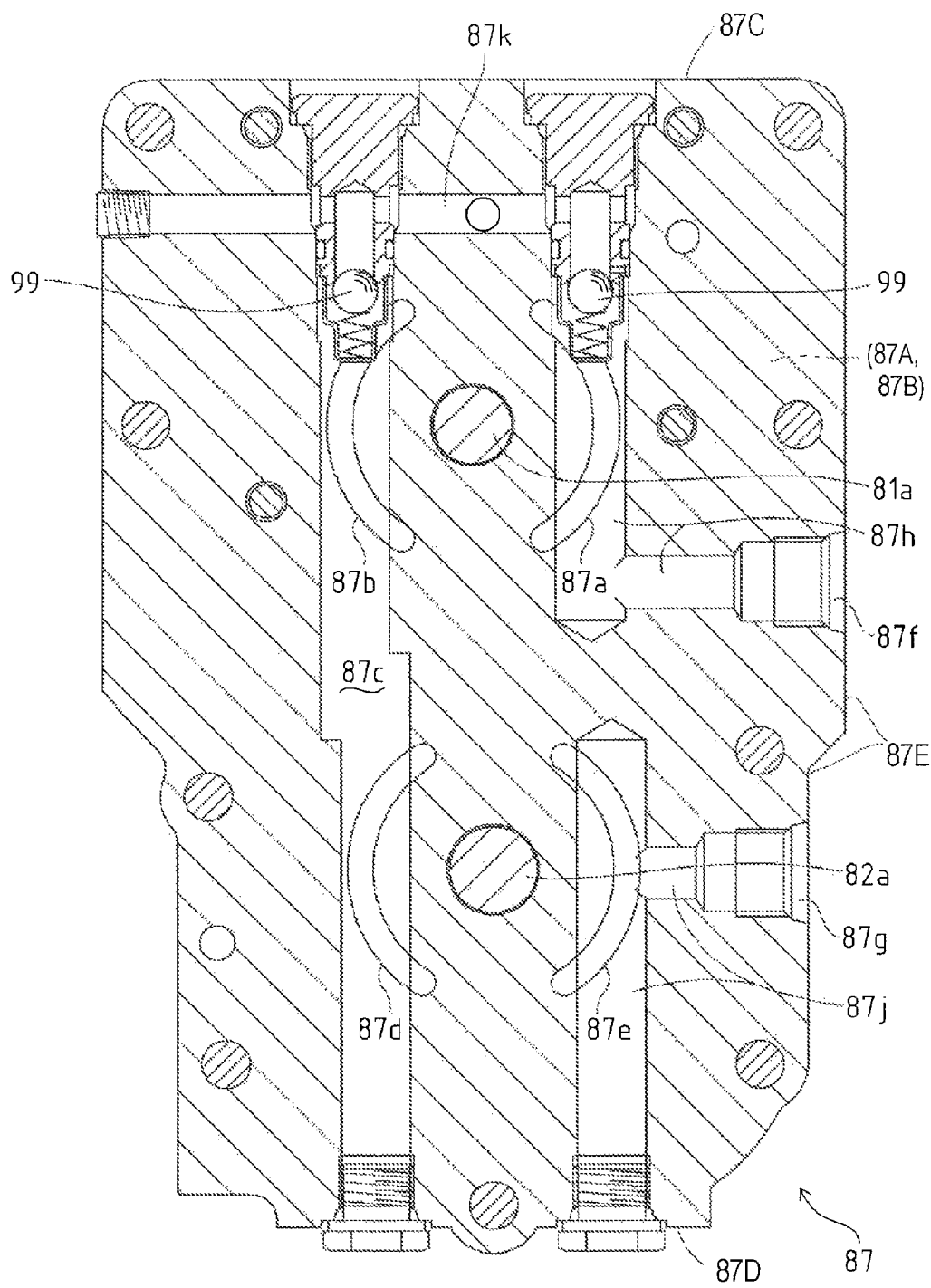
FIG. 12 is a sectional view of a center section 87 for HST 80.

As shown in FIG. 12, center section 87 is formed therein with kidney ports 87a and 87b, which are fluidly opened at pump mounting surface 87P to hydraulic pump 81 so as to serve as supply and delivery ports of hydraulic pump 81, and with kidney ports 87d and 87e, which are fluidly opened at motor mounting surface 87M to hydraulic motor 82 so as to serve as supply and delivery ports of hydraulic motor 82. Ports 87f and 87g are extended parallel to each other and are outwardly opened at outer surface 87E of center section 87 so as to be fluidly connected to drive mode switching valve 89 disposed outside of center section 87 and serving as a connection means for connecting ports 87f and 87g to each other. In center section 87 are bored an oil passage 87h interposed between port 87f and kidney port 87a, an oil passage 87c interposed between kidney ports 87b and 87d, and an oil passage 87j interposed between kidney port 87e and port 87g. Oil passage 87c is extended at one axial end thereof toward outer surface 87C so as to be connected to kidney port 87b, and is extended at the other axial end thereof toward outer surface 87D so as to be connected to kidney port 87d. Oil passage 87c is parallel to oil passages 87h and 87j and is perpendicular to ports 87f and 87g. In this way, center section 87 is formed therein with a part of the closed circuit of HST 80, including the pair of lines L1 and L2 for circulating oil between the delivery port of hydraulic pump 81 and the supply port of hydraulic motor 82 and between the delivery port of hydraulic motor 82 and the supply port of hydraulic pump 81. Oil passage 87c interposed between kidney ports 87b and 87d serves as an entirety of line L1. Oil passages 87h and 87j and ports 87f and 87g together serve as a part of line L2 to be interposed between kidney ports 87a and 87e. Line L2 is completed by connecting the connection means (including drive mode switching valve 89) to ports 87f and 87g.

In center section 87 between kidney ports 87a and 87b and outer surface 87D is also bored a charge oil passage 87k which can communicate with oil passages 87h and 87c. A pair of check valves 99 are interposed between oil passage 87c (at kidney port 87b) and charge oil passage 87k, and between oil passage 87h (at kidney port 87a) and charge oil passage 87k, respectively. Charge oil passage 87k is supplied with oil from charge pump 16, as shown in FIG. 1. Each of check valves 99 is opened to pass oil from charge oil passage 87k into corresponding oil passage 87*h* or 87*c* when corresponding oil passage 87*h* or 87*c* is hydraulically depressed.

HST casing 80*a* also incorporates a PTO shaft 85 disposed in parallel to pump shaft 81*a* and motor shaft 82*a*. PTO shaft 85 projects outward from HST casing 80*a* adjacent to center section 87. In HST casing 80*a*, a PTO clutch 85*a* and a PTO brake 85*b* are provided on PTO shaft 85. PTO clutch 85*a* has a clutch input gear 86*b* relatively rotatably provided on PTO shaft 85. A gear 86*a* is fixed on pump shaft 81*a* and meshes with gear 86*b* so as to transmit the power of engine 4 to PTO shaft 85 through PTO clutch 85*a*.

Motor shaft 82*a* is extended from outer surface 87B of center section 87 into differential gear casing 90R opposite to hydraulic motor 82 so as to be fixedly provided on its end with a bevel motor gear 82*c*. Differential gear casing 90R incorporates a differential gear unit 84 differentially connecting axles 83L and 83R to each other. Unsteerable wheels 92L and 92R are fixed onto outer ends of respective axles 82L and 82R. A deceleration gear train including large and small gears 93*a* and 93*b* is interposed between motor shaft 82*a* and differential gear unit 84. A deceleration gear shaft 93 is disposed in parallel to axles 83L and 83R. Large bevel gear 93*a* is fixed on deceleration gear shaft 93 and meshes with bevel motor gear 82*c*. Small bevel gear 93*b* is formed on deceleration gear shaft 93 and meshes with a bull gear 84*a* of differential gear unit 84.

Differential gear casing 90R has a large opening open at one of left and right sides (in this embodiment, the left side) thereof, and casing cover 90L is attached to differential gear casing 90R so as to cover the large opening, thereby supporting deceleration gear shaft 93 and differential gear unit 84. By removing casing cover 90L from differential gear casing 90R, the large opening of differential gear casing 90R is exposed so as to facilitate disassembly of differential gear unit 84 and deceleration gear shaft 93 with the deceleration gears. An axle casing 11L incorporating axle 83L is fixed at its proximate end to casing cover 90L, and an axle casing 11R incorporating axle 83R to differential gear casing 90R. The interior space of the joint portion of left axle casing 11L and casing cover 90L serves as a left brake chamber 27L for incorporating a left brake 5L for braking left axle 83L, and the interior space of the joint portion of right axle casing 11R and differential gear casing 90R serves as a right brake chamber 27R for incorporating a right brake 5R for braking right axle 83R, so that left and right brakes 5L and 5R are disposed symmetrically.

With respect left brake 5L in brake chamber 27L between axle casing 11L and casing cover 90L, brake pads 8L fitted to axle casing 11L and brake disks 9L fitted on axle 83L are alternately aligned in the proximal portion of axle casing 11L, and a pressure ring 7L disposed around axle 83L is fitted to casing cover 90L so as to confront brake disks 9L and pads 8L. A brake shaft 3L is rotatably supported by axle casing 11L and casing cover 90L, and a brake arm 12L is fixed on the outer end of brake shaft 3L. Brake shaft 3L is partly formed into a cam 3*a* confronting a part of pressure ring 7L. By rotating brake arm 12L for braking, cam 3*a* acts to move pressure ring 7L so as to press brake disks 9L and pads 8L against one another, thereby braking axle 83L. Similar to left brake 5L, right brake 5R in brake chamber 27R between differential gear casing 90R and axle casing 11R includes brake pads 8R, brake disks 9R, pressure ring 7R, a brake shaft 3R with a cam 3*a*, and a brake arm 12R. A parking brake manipulator is operatively connected to both brake arms 12L and 12R so as to brake axles 83L and 83R simultaneously.

Figure 13:
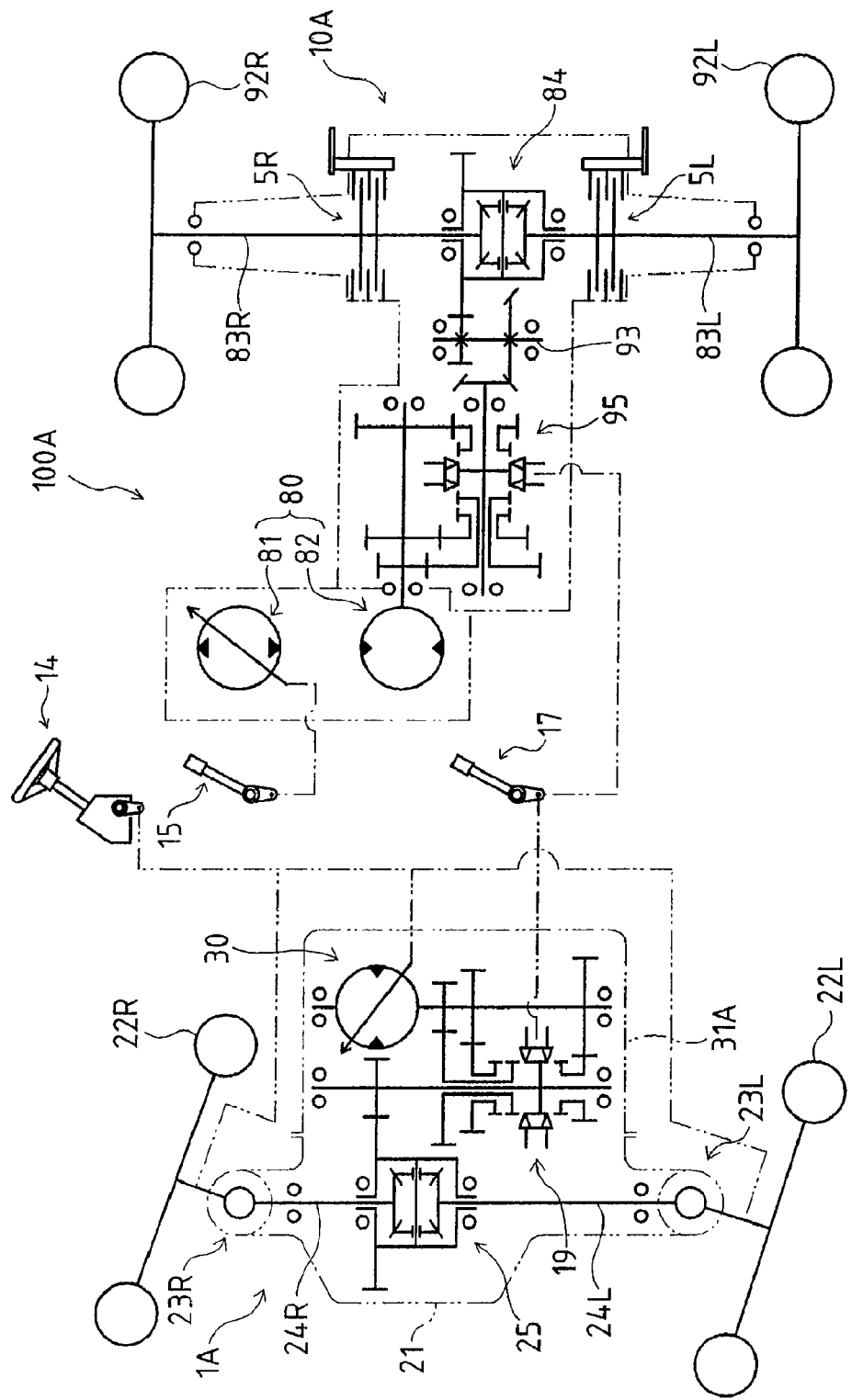
FIG. 13 is a diagram of an alternative four-wheel driving vehicle 100A equipped with an alternative unsteering transaxle 10A and an alternative steering transaxle 1A, showing its mechanical and hydraulic structure, wherein mechanical auxiliary transmissions 19 and 95 are disposed in respective transaxles 1A and 10A.

An alternative four-wheel driving vehicle 100A shown in FIG. 13 will be described. The same parts and members as those of FIG. 1 are designated by the same reference numerals of FIG. 1, and so description of them will be omitted.

Vehicle 100A is equipped with a steering transaxle 1A and an unsteering transaxle 10A distributed before and behind. Steering transaxle 1A and unsteering transaxle 10A incorporate respective mechanical (multi-speed stage) auxiliary transmissions 19 and 95, which are operatively connected to an auxiliary speed control lever 17.

In steering transaxle 1A, an alternative motor supply cover 31A supports hydraulic motor 30 and mechanical auxiliary transmission 19 driven by hydraulic motor 30 so as to constitute an assembly unit to be detachably attached to transaxle casing 21. When the assembly unit is attached to transaxle casing 21, motor supply cover 31A is disposed to cover the opening (such as opening 21*d* or 21*d'*) of transaxle casing 21 so as to drivingly connect mechanical auxiliary transmission 19 to differential gear unit 25 in transaxle casing 21 through the opening of transaxle casing 21. In this way, in steering transaxle 1, mechanical auxiliary transmission 19 is drivingly interposed between hydraulic motor 30 and differential gear unit 25.

In unsteering transaxle 10A, mechanical auxiliary transmission 95 is drivingly interposed between motor shaft 82*a* of hydraulic motor 82 and deceleration gear shaft 93. Alternatively, it may be drivingly interposed between deceleration gear shaft 93 and differential gear unit 84.

Figure 14:
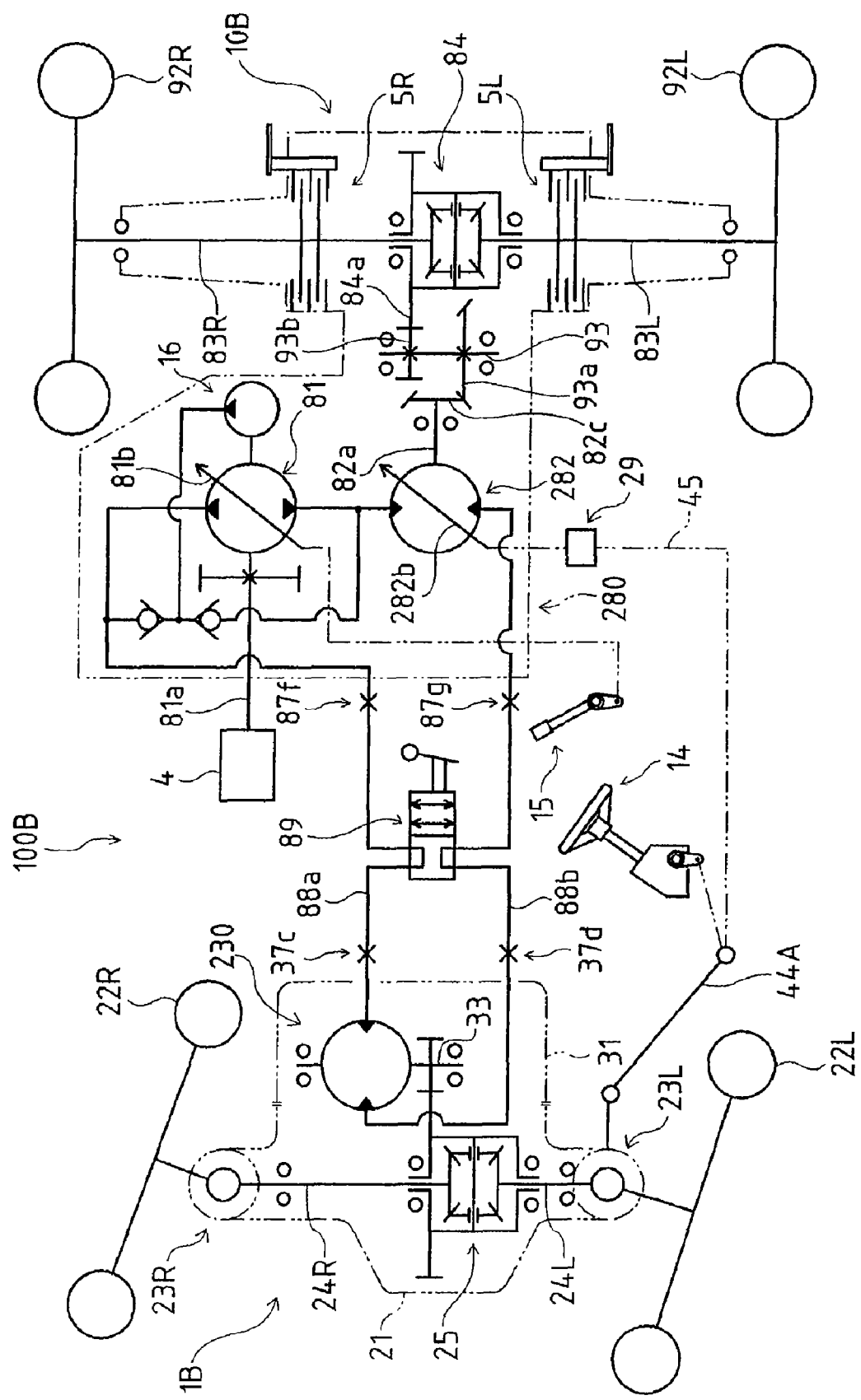
FIG. 14 is a diagram of an alternative four-wheel driving vehicle 100B equipped with an alternative unsteering transaxle 10B and an alternative steering transaxle 1B, showing its mechanical and hydraulic structure, wherein a fixed displacement hydraulic motor 230 is disposed in steering transaxle 1B, and a variable displacement hydraulic motor 282 in unsteering transaxle 10B.
Figure 15:
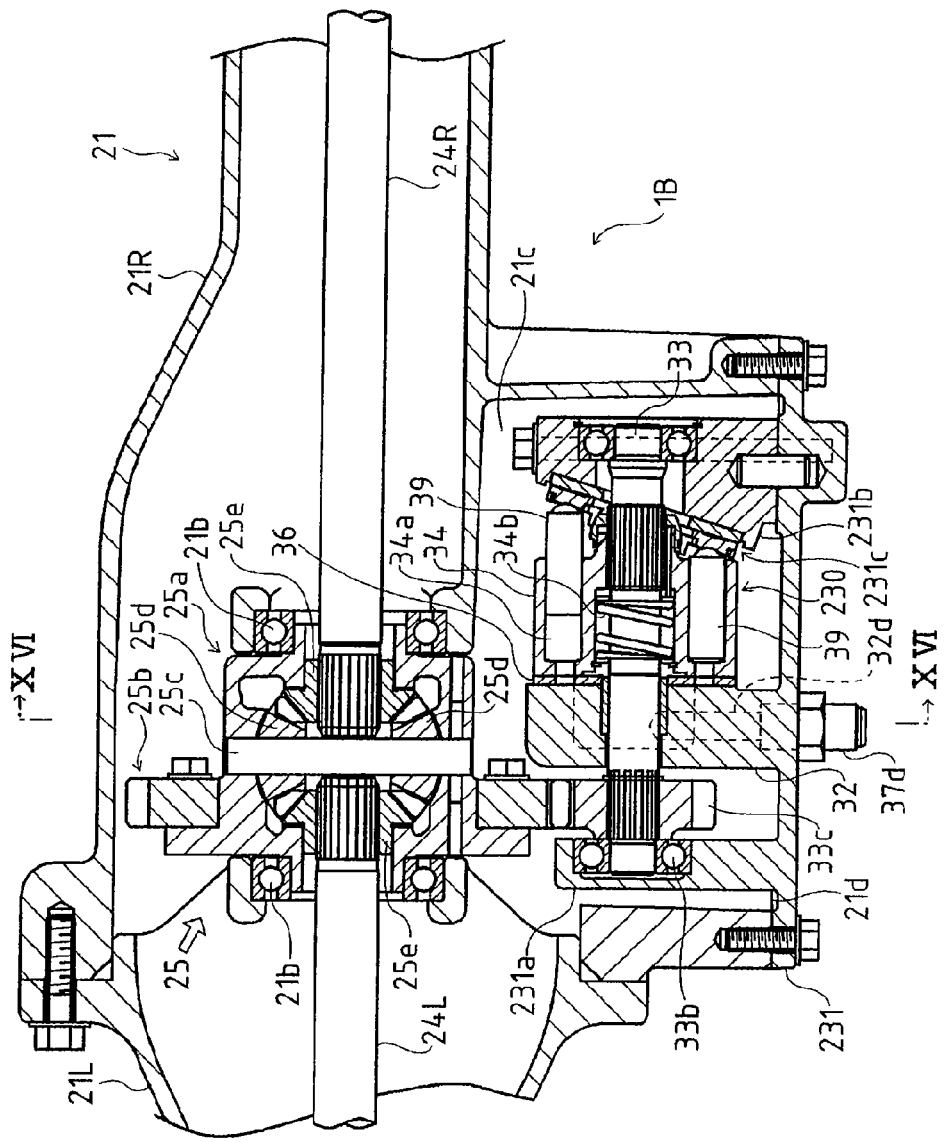
FIG. 15 is a fragmental sectional plan view of steering transaxle 1B, showing that fixed displacement hydraulic motor 230 supported by an alternative motor support cover 231 is drivingly connected to differential gear unit 25 in transaxle casing 21.
Figure 16:
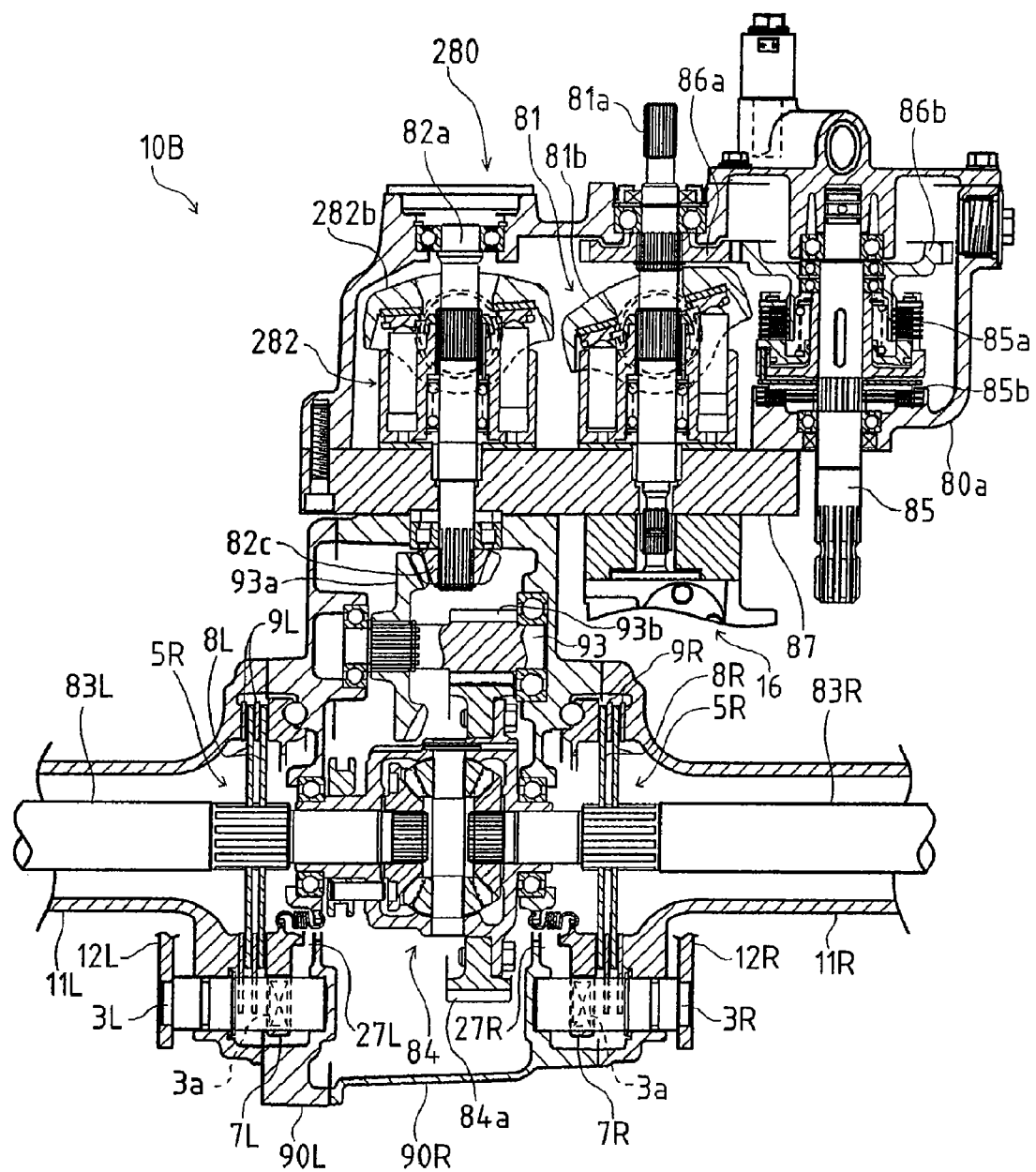
FIG. 16 is a sectional view of unsteering transaxle 10B with an HST 280.

An alternative four-wheel driving vehicle 100B shown in FIGS. 14, 15 and 16 will be described. FIGS. 14, 15 and 16 illustrate the same parts and members as those of FIGS. 1, 2 and 11, which are designated by the same reference numerals of FIGS. 1, 2 and 11, and so description of the parts and members will be omitted. Further, FIGS. 3, 6 and 12 are applied for description of vehicle 100B.

The important distinctive point of vehicle 100B compared with vehicle 100 is that an alternative steering transaxle 1 incorporates a fixed displacement hydraulic motor 230, and an HST 280 in an unsteering transaxle 10B includes a variable displacement hydraulic motor 282 fluidly connected to hydraulic pump 81. In this regard, hydraulic motor 230 has a fixed swash plate 231*c* and axial motor shaft 33 in parallel to drive shafts 24L and 24R as shown in FIG. 15, and hydraulic motor 282 has a movable swash plate 282*b* and axial motor shaft 82*a* as shown in FIG. 16.

With respect to steering transaxle 1B having fixed displacement hydraulic motor 230, a motor support cover 231 supporting hydraulic motor 230 is slimmed in comparison with motor support cover 31 shown in FIG. 2 because hydraulic motor 230 needs no mechanism for controlling the slant angle of swash plate 231*c*. A motor shaft support portion 231*a* formed of motor support cover 231 and a motor shaft support block 231*b* fixed to motor support cover 231 journal respective ends of motor shaft 33 of hydraulic motor 230. Center section 32 formed of motor support cover 231 between motor shaft support portion 231*a* and motor shaft support block 231*b* passes motor shaft 33 therethrough and fits cylinder block 34 through valve plate 36 so as to constitute hydraulic motor 230, similar to that of FIG. 2. Hydraulic motor 230 is disposed between center section 32 and fixed swash plate 231*c* on motor shaft support block 231*b*, and motor gear 33*c* meshing with bull gear 25*b* of differential gear unit 25 is fixed on motor shaft 33 between motor support portion 231*a* and center section 32.

As shown in FIG. 14, a motor control unit 29 is provided for movable swash plate 282*b* of hydraulic motor 282 for reducing the rotary speed of unsteerable wheels 92L and 92R to balance with the rotary speed of steerable wheels 22L and 22R during turning of vehicle 100B. A link rod 44A is operatively interposed between steering wheel 14 and one of axle supply units 23L and 23R so as to steer axle supply units 23L and 23R according to rotation of steering wheel 14. Link rod 44A is also operatively connected to motor control unit 29 so as to change the slant angle of swash plate 282 according to the steered angle of axle supply units 23L and 23R. Instead of link rod 44A connected to one of axle supply units 23L and 23R, motor control unit 29 may be operatively connected to any active portion of the linkage from steering wheel 14 to each of steerable wheels 22L and 22R.

When vehicle 100B travels straight, movable swash plate 282b is disposed at the minimum slant angle for defining the minimum displacement of hydraulic motor 282. During turning of vehicle 100B, the slant angle of movable swash plate 282b is increased to increase the displacement of hydraulic motor 282, thereby decelerating unsteerable wheels 92L and 92R.

Figure 17:
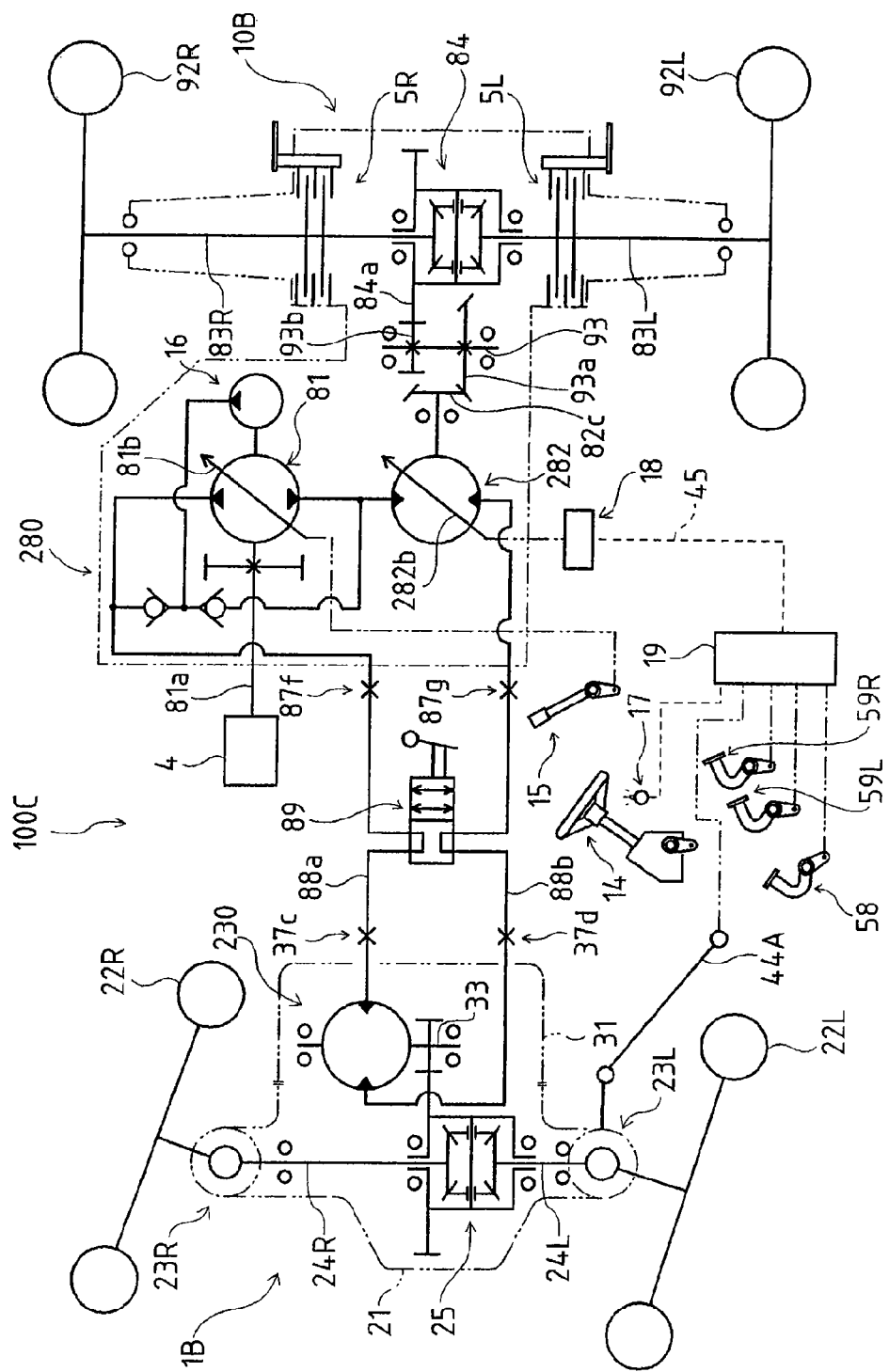
FIG. 17 is a diagram of an alternative four-wheel driving vehicle 100C equipped with unsteering transaxle 10B and steering transaxle 1B, showing its mechanical and hydraulic structure, wherein variable displacement hydraulic motor 282 is servo-controlled.

Referring to FIG. 17, in an alternative vehicle 100C having fixed displacement hydraulic motor 230 and variable displacement hydraulic motor 282, left and right brakes 5L and 5R for braking respective axles 83L and 83R are operated individually, thereby enabling brake-turn of vehicle 100C. In this regard, left and right brake pedals 59L and 59R are interlockingly connected to respective brake arms 12L and 12R.

The slant angle of movable swash plate 282b of hydraulic motor 282 is controlled by actuation of a servo actuator 18. Vehicle 100C is equipped with a controller 19 from which a communication line 45 is extended to servo actuator 18. The angle of link rod 44A operatively interposed between steering wheel 14 and one of axle support units 23L and 23R is detected by a potentiometer, and its detection signal is inputted to controller 19. Controller 19 outputs a command signal to servo actuator 18 according the detection signal about the angle of link rod 44A. Alternatively, any active portion of the linkage from steering wheel 14 to each of steerable wheels 22L and 22R may serve as a detection target for controlling servo actuator 18.

Brake pedals 59L and 59R and an accelerator pedal 58 are provided with respective potentiometers electrically connected to controller 19. Due to the setting of controller 19 for controlling servo actuator 18, when steering wheel 14 is fully rotated and neither brake pedal 59L nor 59R is depressed, the periphery speed of steerable wheels 22L and 22R becomes about 1.5 to 1.7 times as large as that of unsteerable wheels 92L and 92R. If steering wheel 14 is fully rotated and one of brake pedals 59L and 59R is depressed, the slant angle of swash plate 282b is further increased to reduce the rotary speed of unsteerable wheels 92L and 92R so that the periphery speed of steerable wheels 22L and 22R becomes about twice as large as that of unsteerable wheels 92L and 92R. Therefore, reduction of depression of accelerator pedal 58 is unnecessary for brake-turn of vehicle 100C. The deceleration rate of unsteerable wheels 92L and 92R by controlling of servo actuator 18 for brake-turn of vehicle 100C may be inversely proportional to the traveling speed of vehicle 100C. Further, vehicle 100C includes an adjusting dial 17 for setting the actuation speed of servo actuator 18. For example, adjusting dial 17 may be rotatable among low, medium and high speed positions.

Figure 18:
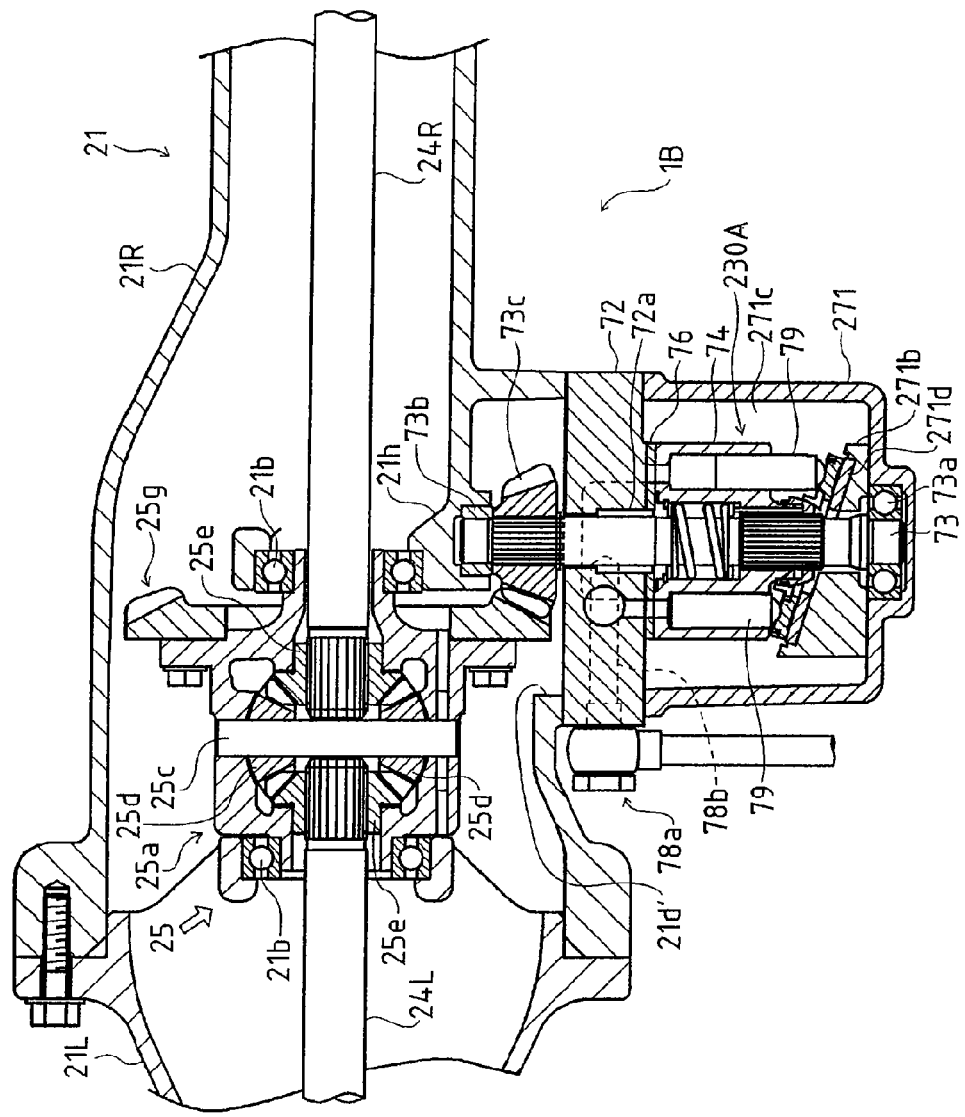
FIG. 18 is a fragmental sectional plan view of steering transaxle 1B, showing that fixed displacement hydraulic motor 230A supported by an alternative motor support cover 271 is drivingly connected to differential gear unit 25 in transaxle casing 21.

FIG. 18 illustrates transaxle casing 21 with an alternative motor support cover 271 incorporating an alternative fixed displacement hydraulic motor 230A, in comparison with FIG. 8. Hydraulic motor 230A has motor shaft 73, which is perpendicular to drive shafts 24L and 24R. An open end of motor support cover 271 toward transaxle casing 21 is fixed to center section 72 so as to form a motor chamber 271c enclosed by motor support cover 271 and center section 71. Hydraulic motor 230A with a fixed swash plate 271d and a retainer 271b holding fixed swash plate 271d is supported between center section 72 and motor support cover 271 in motor chamber 271c. Other part and members designated by the same reference numerals of FIG. 8 are identical with those of FIG. 8, and so description of them is omitted.

In comparison with motor support cover 71 of FIG. 8, motor support cover 271 of FIG. 18 is slimmed because it supports fixed displacement hydraulic motor 230A and no mechanism for controlling the slant angle of swash plate 271d.

Figure 19:
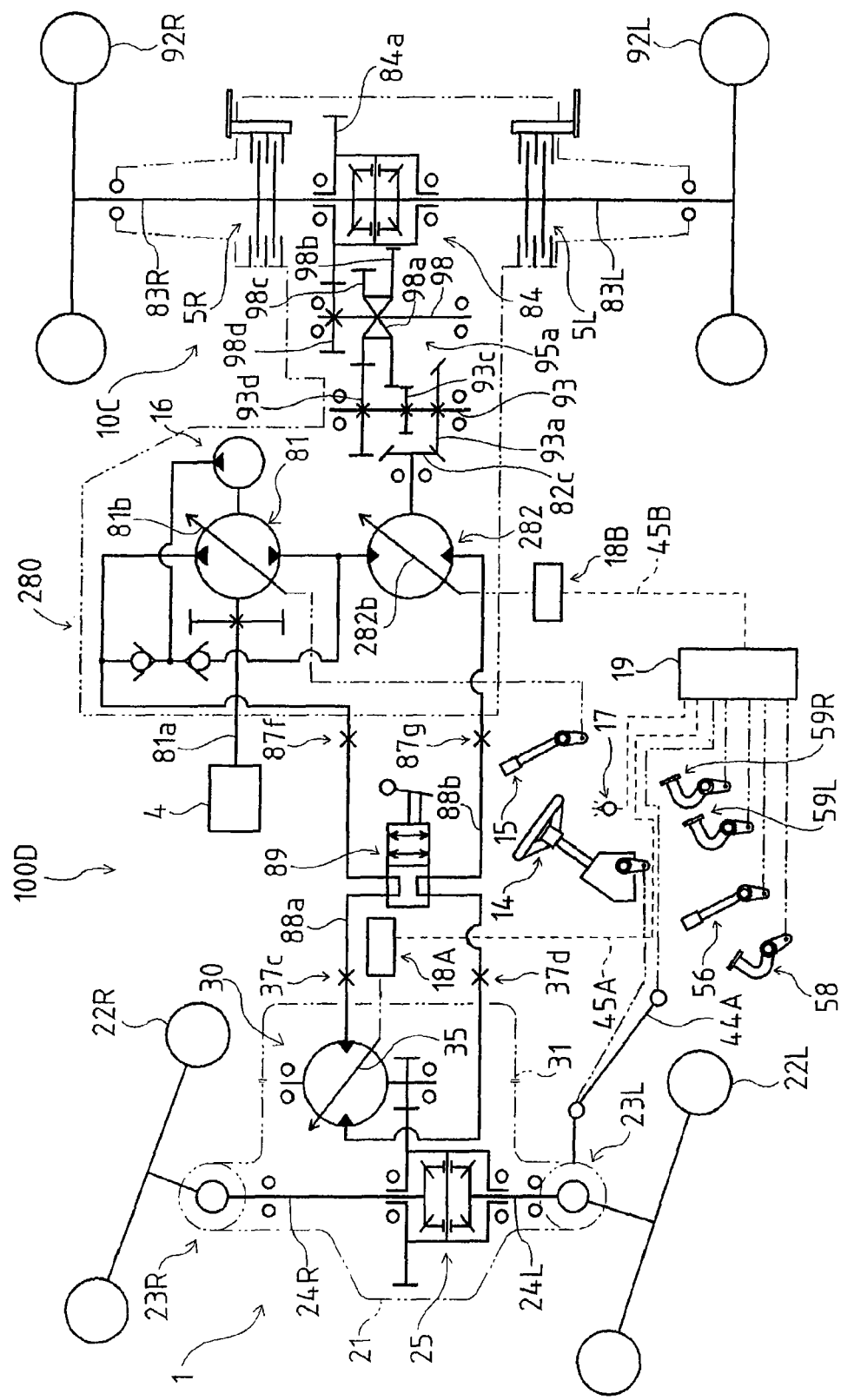
FIG. 19 is a diagram of an alternative four-wheel driving vehicle 100D equipped with an alternative unsteering transaxle 10C and steering transaxle 1, showing its mechanical and hydraulic structure, wherein servo-controlled variable displacement hydraulic motor 30 is disposed in steering transaxle 1, and servo-controlled variable displacement hydraulic motor 282 and a mechanical auxiliary transmission 95a are disposed in unsteering transaxle 10C.

An alternative vehicle 100D shown in FIG. 19 includes variable displacement hydraulic motor 30 for driving steerable wheels 22L and 22R and variable displacement hydraulic motor 282 for driving unsteerable wheels 92L and 92R. A servo actuator 18A for controlling movable swash plate 35 of hydraulic motor 30 is connected to controller 19 through a communication line 45A, and a servo actuator 10B for controlling movable swash plate 282b of hydraulic motor 282 is connected to controller 19 through a communication line 45B.

Controller 19 controls servo actuator 18A and 18B based on the detection of the angle of link rod 44A (or the detection of movement of any active portion of the linkage from steering wheel 14 to each of steerable wheels 22L and 22R) so that the periphery speed of steerable wheels 22L and 22R is balanced with that of unsteerable wheels 92L and 92R during turning of vehicle 100D. Further, controller 19 controls servo actuator 18A and 18B based on the detection of depression of brake pedals 59L and 59R as well as the detection of the angle of link rod 44A so that the periphery speed of steerable wheels 22L and 22R is balanced with that of unsteerable wheels 92L and 92R during the brake-turn of vehicle 100D.

Figure 20:
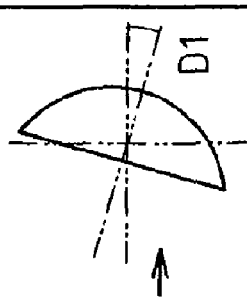
FIG. 20 is a table representing a control pattern of movable swash plates 35 and 282b of hydraulic motors 30 and 282 in vehicle 100D.

Referring to FIG. 20, an example of control pattern of movable swash plates 35 and 282b will be described. While vehicle 100D travels straight, slant angles D2 of swash plates 35 and 282b are kept in constant. As steering wheel 14 is rotated for turning, the slant angle of swash plate 35 is reduced from angle D2 so as to accelerate steerable wheels 22L and 22R while angle D2 of swash plate 282b is kept. When steering wheel 14 is fully rotated without depression of brake pedals 59L and 59R, the reduced slant angle of swash plate 35 reaches minimum angle D1 so that the periphery speed of steerable wheels 22L and 22R becomes about 1.5 to 1.7 times as large as that of unsteerable wheels 92L and 92R, for example. As one of brake pedals 59L and 59R is depressed during the full rotation of steering wheel 14, the slant angle of swash plate 282b is increased from angle D2 so as to decelerate unsteerable wheels 92L and 92R while minimum angle D1 of swash plate 35 is kept. When the one of brake pedals 59L and 59R is fully depressed, the increased slant angle of swash plate 282b reaches maximum angle D3 so that the periphery speed of steerable wheels 22L and 22R becomes about twice as large as that of unsteerable wheels 92L and 92R, for example.

In comparison with the control of movable swash plate 35 of hydraulic motor 30 in vehicle 100 as shown in FIG. 1 and with the control of movable swash plate 282b of hydraulic motor 282 in vehicle 100B or 100C as shown in FIG. 14 or 17, the movement of each of movable swash plates 35 and 282b in vehicle 100D can be reduced because of cooperation of movable swash plates 35 and 282b.

Further, vehicle 100D shown in FIG. 19 is equipped with steering transaxle 1 (shown also in FIG. 1) and an alternative unsteering transaxle 10C. Unsteering transaxle 10C is provided with HST 280 including hydraulic pump 81 and motor 282, and incorporates a mechanical auxiliary transmission 95a including deceleration gear shaft 93 and a clutch shaft 98. On deceleration gear shaft 93 are fixed bevel gear 93a meshing with bevel motor gear 82c fixed on motor shaft 82a, a small low-speed gear 93c and a large high-speed gear 93d.

Clutch shaft 98 is disposed in parallel to deceleration gear shaft 93. A large low-speed clutch gear 98b and a small high-speed clutch gear 98c are fixed together on a slider 98a slidably fitted on clutch shaft 98. One of clutch gears 98b and 98c selectively mesh with corresponding gear 93c or 93d. When clutch gear 98b meshes with gear 93c, auxiliary transmission 95a is set at a low speed stage. When clutch gear 98c meshes with gear 93d, auxiliary transmission 95a is set at a high speed stage. A gear 98d is fixed on clutch shaft 98 and meshes with bull gear 84a of differential gear unit 84.

In vehicle 100D of FIG. 19, other parts and members designated by the same reference numerals of FIGS. 1, 14 and 17 are identical with those of vehicles 100, 100B and 100C, and so description of them is omitted.

What is claimed is:

1. A fluid passage member comprising:
   a pump mounting surface onto which a hydraulic pump having a rotary axis is mounted;
   first and second kidney ports opened at the pump mounting surface;
   a first fluid extraction port outwardly opened and connected to the first kidney port;
   a motor mounting surface onto which a hydraulic motor having a rotary axis is mounted such that the rotary axis of the hydraulic motor is parallel to the rotary axis of the hydraulic pump;
   third and fourth kidney ports opened at the motor mounting surface;
   a second fluid extraction port outwardly opened and connected to the third kidney port; and
   a fluid passage interposed between the second and fourth kidney ports, the fluid passage extending from the second kidney port to the fourth kidney port so as to fluidly connect the second and fourth kidney ports together, wherein the first kidney port and the first fluid extraction port are separated from the third kidney port and the second fluid extraction port, wherein the first and second fluid extraction ports are adapted to be fluidly connected via piping to a second hydraulic motor which is not mounted on the motor mounting surface of the fluid passage member, wherein a pair of fluid lines extend between the hydraulic pump mounted on the pump mounting surface and the hydraulic motor mounted on the motor mounting surface, wherein the second and fourth kidney ports and the fluid passage in the fluid passage member serve as an entirety of one of the fluid lines, wherein the first and third kidney ports and the first and second extraction ports in the fluid passage member serve as a part of the other of the fluid lines, and wherein the other of the fluid lines is completed with the piping and the second hydraulic motor.

2. The fluid passage member according to claim 1, wherein a switching valve is disposed on the piping to be interposed between the first and second fluid extraction ports and the second hydraulic motor.

3. The fluid passage member according to claim 1, wherein the outward openings of the first and second fluid extraction ports are disposed in the same direction.

4. A fluid passage member comprising:
   a pump mounting surface onto which a hydraulic pump having a rotary axis is mounted;
   first and second kidney ports opened at the pump mounting surface;
   a first fluid extraction port outwardly opened and connected to the first kidney port;
   a motor mounting surface onto which a hydraulic motor having a rotary axis is mounted such that the rotary axis of the hydraulic motor is parallel to the rotary axis of the hydraulic pump;
   third and fourth kidney ports opened at the motor mounting surface;
   a second fluid extraction port outwardly opened and connected to the third kidney port;
   a fluid passage interposed between the second and fourth kidney ports, the fluid passage extending from the second kidney port to the fourth kidney port so as to fluidly connect the second and fourth kidney ports together, wherein the first kidney port and the first fluid extraction port are separated from the third, kidney port and the second fluid extraction port;
   a first outer surface on which the pump mounting surface and the motor mounting surface are formed;
   a second outer surface defining one end of the first outer surface closer to the pump mounting surface than the motor mounting surface;
   a third outer surface defining another end of the first outer surface opposite to the second outer surface closer to the motor mounting surface rather than the pump mounting surface; and
   a fourth outer surface defining another end of the first outer surface between the second and third outer surfaces, wherein the first and second extraction ports are outwardly opened at the fourth outer surface.

5. The fluid passage member according to claim 4, wherein the fluid passage interposed between the second and fourth kidney ports is a first fluid passage extended parallel to the first outer surface and perpendicular to the second and third outer surfaces, the fluid passage member further comprising:
   a second fluid passage extended parallel to the first fluid passage so as to connect the first kidney port to the first fluid extraction port; and
   a third fluid passage extended parallel to the first fluid passage so as to connect the third kidney port to the second fluid extraction port, and to be separated from the second fluid passage.

6. The fluid passage member according to claim 5, further comprising:
   a pair of charge check valves disposed in the respective first and second fluid passages.

7. The fluid passage member according to claim 4, wherein the first outer surface is adapted to have a casing fitted thereto, and wherein the casing incorporates the hydraulic pump and motor mounted on the respective pump and motor mounting surfaces in the first outer surface.

8. The fluid passage member according to claim 4, further comprising:
   a fifth outer surface disposed opposite to the first outer surface in the rotary axial directions of the hydraulic pump and motor, wherein the fifth outer surface is adapted to have a charge pump fitted thereto so as to be driven by the hydraulic pump.

9. The fluid passage member according to claim 4, further comprising:
   a fifth outer surface disposed opposite to the first outer surface in the rotary axial directions of the hydraulic pump and motor, wherein the fifth outer surface is adapted to have a casing fitted thereto, and wherein the casing supports an axle and incorporates a drive train which is driven by the hydraulic motor to drive the axle.

* * * * *